US012588000B2

(12) United States Patent
Yang et al.

(10) Patent No.: US 12,588,000 B2
(45) Date of Patent: Mar. 24, 2026

(54) SIGNAL PROCESSING METHOD AND APPARATUS

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Fang-chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 428 days.

(21) Appl. No.: 18/033,358

(22) PCT Filed: Oct. 22, 2021

(86) PCT No.: PCT/CN2021/125808
§ 371 (c)(1),
(2) Date: Apr. 24, 2023

(87) PCT Pub. No.: WO2022/083756
PCT Pub. Date: Apr. 28, 2022

(65) Prior Publication Data
US 2023/0388968 A1 Nov. 30, 2023

(30) Foreign Application Priority Data
Oct. 23, 2020 (CN) .......................... 202011150426.7

(51) Int. Cl.
*H04W 68/02* (2009.01)
*H04W 52/02* (2009.01)
(Continued)

(52) U.S. Cl.
CPC ....... *H04W 68/02* (2013.01); *H04W 52/0212* (2013.01); *H04W 56/001* (2013.01); *H04W 68/005* (2013.01); *H04W 76/28* (2018.02)

(58) Field of Classification Search
None
See application file for complete search history.

(56) References Cited

U.S. PATENT DOCUMENTS

2019/0357170 A1   11/2019   Liu
2020/0022105 A1    1/2020   Fu et al.
2023/0239835 A1*   7/2023   Wu ................... H04W 56/0015
                                                   455/458

FOREIGN PATENT DOCUMENTS

CN        108632961 A      10/2018
CN        110012524 A       7/2019
(Continued)

OTHER PUBLICATIONS

European Patent Office, the Extended European Search Report Issued in Application No. 21882168.4, Mar. 7, 2024, Germany, 7 pages.
(Continued)

*Primary Examiner* — Suhail Khan
(74) *Attorney, Agent, or Firm* — KILPATRICK TOWNSEND & STOCKTON LLP

(57) ABSTRACT

The present application provides a signal processing method and apparatus, where a network device configures a location of a paging indication signal for a terminal device in an idle state, after the network device transmits the paging indication signal to the terminal device according to the location of the paging indication signal, the terminal device may avoid consuming more energy caused by a relatively long distance between the location of the paging indication signal and a synchronization reference signal, and/or, the terminal device may avoid reducing the demodulation and decoding (Continued)

performance of the paging indication signal caused by a relatively long distance between the location of the paging indication signal and a channel time-frequency tracking reference signal.

18 Claims, 16 Drawing Sheets

(51) Int. Cl.
*H04W 56/00* (2009.01)
*H04W 68/00* (2009.01)
*H04W 76/28* (2018.01)

(56) References Cited

FOREIGN PATENT DOCUMENTS

| CN | 110062461 A | 7/2019 |
|----|-------------|--------|
| CN | 110536313 A | 12/2019 |
| CN | 110972237 A | 4/2020 |
| CN | 111246503 A | 6/2020 |
| CN | 111343717 A | 6/2020 |
| CN | 111385826 A | 7/2020 |
| WO | 2019134643 A1 | 7/2019 |
| WO | 2019191984 A | 10/2019 |
| WO | 2020088257 A1 | 5/2020 |

OTHER PUBLICATIONS

The first office action issued in Chinese corresponding application 202011150426.7, mailed on Jan. 24, 2025.
MediaTek Inc.,"Paging Enhancements for UE Power Saving in NR",3GPP TSG-RAN WG2 Meeting #111 electronic, Online, Aug. 17-28, 2020, total 8 pages, R2-2008361.
Office Action of Corresponding CN Patent Application No. 202011150426.7 Dated Jun. 12, 2025.
Intel Corporation, "Considerations on PDCCH-based power saving signal", 3GPP TSG-RAN WG1 #99, R1-1912225, Agenda Item 7.2.9.1, Reno, USA, Nov. 18-22, 2019.

* cited by examiner

SIGNAL PROCESSING METHOD AND APPARATUS

CROSS-REFERENCE TO RELATED APPLICATION

This application is a National stage of International Application No. PCT/CN2021/125808, which claims priority to Chinese Patent Application No. 202011150426.7, entitled "SIGNAL PROCESSING METHOD AND APPARATUS", filed with the China National Intellectual Property Administration on Oct. 23, 2020, both of which are hereby incorporated by reference in their entireties.

FIELD

The present application relates to the field of communication technologies and, in particular, to a signal processing method and apparatus.

BACKGROUND

In the subject of user equipment (UE) energy conservation in new radio (NR), for the UE energy conservation, a downlink control information-based (DCI-based) format may be used as a paging indication signal (paging early indication, PEI) indication, or a sequence-based configured wake-up signal (WUS) may be used as the PEI indication.

In a possible way, under a radio resource control-connected (RRC-connected) state, a DCI format 2-6 may be used as a PEI indication; while under a radio resource control idle (RRC-idle) state, a sequence-based tracking reference signal (TRS)/channel state indicator-reference signal (CSI-RS) or a synchronization signal block (SSB) may be used as a PEI indication.

However, in the prior art, when UE performs adaptive processing based on indication of the PEI, it is likely that the energy consumption is high or the demodulation and decoding performance of the PEI is low.

SUMMARY

Embodiments of the present application provide a signal processing method and apparatus, where a network device configures a location of a paging indication signal for a terminal device in an idle state, after the network device transmits the paging indication signal to the terminal device according to the location of the paging indication signal, the terminal device may avoid consuming more energy caused by a relatively long distance between the location of the paging indication signal and a synchronization reference signal, and/or, the terminal device may avoid reducing the demodulation and decoding performance of the paging indication signal caused by a relatively long distance between the location of the paging indication signal and a channel time-frequency tracking reference signal.

In one embodiment of the present application provides a signal processing method, including: configuring, by a network device, a location of a paging indication signal for a terminal device in an idle state; and transmitting, by the network device, the paging indication signal to the terminal device according to the location of the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the method further includes: transmitting, by the network device, a synchronization reference signal and/or a channel time-frequency tracking reference signal to the terminal device.

In one embodiment, the paging indication signal is repeatedly transmitted after multiple synchronization reference signals; or the paging indication signal is transmitted after multiple synchronization reference signals to indicate different terminal subgroups at a same paging location.

In one embodiment of the present application provides a signal processing method, including: receiving, by a terminal device, a paging indication signal from a network device, where the terminal device is in an idle state, and the paging indication signal is transmitted by the network device based on configuration of a location of the paging indication signal; and performing, by the terminal device, data processing according to the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the method further includes: receiving, by the terminal device, a synchronization reference signal and/or a channel time-frequency tracking reference signal from the network device.

In one embodiment, the paging indication signal is repeatedly transmitted after multiple synchronization reference signals; or the paging indication signal is transmitted after multiple synchronization reference signals to indicate different terminal subgroups at a same paging location.

In one embodiment of the present application provides a signal processing apparatus, including a memory, a transceiver and a processor: the memory is configured to store a computer program; the transceiver is configured to transmit and receive data under control of the processor; and the processor is configured to read the computer program in the memory and perform following operations: configuring a location of a paging indication signal for a terminal device in an idle state; and transmitting the paging indication signal to the terminal device according to the location of the paging indication signal.

In one embodiment, the processor further performs the following operations: the location of the paging indication signal associates with any of following information: information about a location of a paging signal, information about a location of a channel time-frequency tracking reference signal or information about a location of a synchronization reference signal.

In one embodiment, the processor further performs the following operations: the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the processor further performs the following operations: the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, the processor further performs the following operations: if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following:

a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, the processor further performs the following operations: if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the processor further performs the following operations: transmitting, by the network device, a synchronization reference signal and/or a channel time-frequency tracking reference signal to the terminal device.

In one embodiment, the paging indication signal is repeatedly transmitted after multiple synchronization reference signals; or the paging indication signal is transmitted after multiple synchronization reference signals to indicate different terminal subgroups at a same paging location.

In one embodiment of the present application provides a signal processing apparatus, including a memory, a transceiver and a processor: the memory is configured to store a computer program; the transceiver is configured to transmit and receive data under control of the processor; and the processor is configured to read the computer program in the memory and perform following operations: receiving a paging indication signal from a network device, where the terminal device is in an idle state, and the paging indication signal is transmitted by the network device based on configuration of a location of the paging indication signal; and performing data processing according to the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, the processor further performs the following operations: if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the processor further performs the following operations: receiving, by the terminal device, a synchronization reference signal and/or a channel time-frequency tracking reference signal from the network device.

In one embodiment, the processor further performs the following operations: the paging indication signal is repeatedly transmitted after multiple synchronization reference signals; or the paging indication signal is transmitted after multiple synchronization reference signals to indicate different terminal subgroups at a same paging location.

In one embodiment of the present application provides a signal processing apparatus, including: a processing unit, configured to configure a location of a paging indication signal for a terminal device in an idle state; and a transmitting unit, configured to transmit the paging indication signal to the terminal device according to the location of the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the transmitting unit is specifically configured to transmit a synchronization reference signal and/or a channel time-frequency tracking reference signal to the terminal device.

In one embodiment, the paging indication signal is repeatedly transmitted after multiple synchronization reference signals; or the paging indication signal is transmitted after multiple synchronization reference signals to indicate different terminal subgroups at a same paging location.

In one embodiment of the present application provides a signal processing apparatus, including: a receiving unit, configured to receive a paging indication signal from a network device, where the terminal device is in an idle state, and the paging indication signal is transmitted by the network device based on configuration of a location of the paging indication signal; and a processing unit, configured to perform data processing according to the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the receiving unit is configured to receive a synchronization reference signal and/or a channel time-frequency tracking reference signal from the network device.

In one embodiment, the paging indication signal is repeatedly transmitted after multiple synchronization reference signals; or the paging indication signal is transmitted after multiple synchronization reference signals to indicate different terminal subgroups at a same paging location.

In one embodiment of the present application provides a processor-readable storage medium storing a computer program, where the computer program is configured to enable a processor to perform the method described in the embodiments.

In one embodiment of the present application provides a computer program product including an instruction; where when the instruction is run on a computer, enabling the computer to execute the method as described in the embodiments.

In one embodiment of the present application provides a signal processing system, including the network device and the terminal device as described in any one of the above.

It should be understood that the content described in the summary is not intended to limit a key or important feature of the embodiments of the present application, nor is it intended to limit the scope of the present application. Other features of the present application will be easily understood through the following description.

BRIEF DESCRIPTION OF THE DRAWINGS

In order to more clearly describe the embodiments of the present application or the prior art, in the following, the drawings that need to be used in the description of the embodiments or the prior art will be briefly introduced. Apparently, the drawings in the following description are a part of embodiments of the present application.

DESCRIPTION OF EMBODIMENTS

The term "and/or" in the present application describes an association relationship between associated objects, indicating that there can be three kinds of relationships, for example, A and/or B, which may indicate that there are three situations: A alone, A and B simultaneously, and B alone.

The character "/" generally indicates that the preceding and following associated objects are an "or" relationship.

The term "multiple" in the embodiments of the present application refers to two or more, and other quantifiers are similar.

In the following, a description of the embodiments of the present application will be given in combination with the drawings in the embodiments of the present application. Apparently, the described embodiments are a part rather than all embodiments of the present application.

The embodiments of the present application may be applied to a variety of systems, especially a 5G system. For example, the applicable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These systems include a terminal device and a network device. The systems may further include a core network part, such as an evolved packet system (EPS), a 5G system (5GS), etc.

In the energy saving of NR release (R16), a downlink control Information-based (DCI-based) format may be used as a paging indication signal (PEI) indication for energy saving of user equipment (UE) (or a terminal device). For example, the downlink control information (DCI) format used as the PEI indication may include a DCI format 1-0 or a DCI format 2-6.

Figure 1:
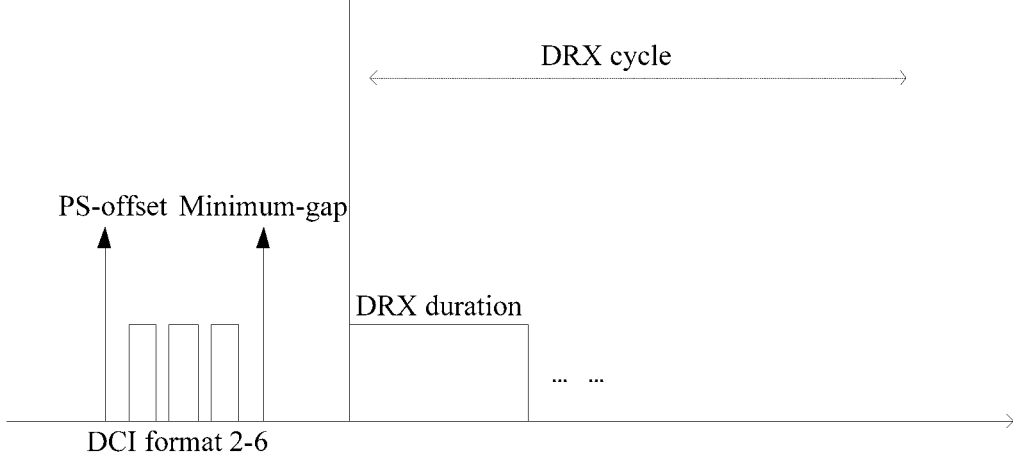
FIG. 1 is a schematic diagram showing under RRC-connected, a downlink control information (DCI) format 2-6 being used as a PEI provided by an embodiment of the present application.

Exemplarily, FIG. 1 is a schematic diagram showing under radio resource control-connected (RRC-connected), a DCI format 2-6 being used as a PEI provided by an embodiment of the present application. As shown in FIG. 1, when UE is under RRC-connected, the DCI format 2-6 is used to indicate whether the UE needs to monitor a physical downlink control channel (PDCCH) at discontinuous reception (DRX). For example, radio resource control (RRC) high-layer signaling is configured with a power saving-offset (PS-offset) or a minimum-gap to ensure that UE monitors the DCI format 2-6 within a duration.

In one embodiment, a sequence-based signal may be used as the PEI indication for UE energy saving. For example, the sequence-based PEI indication may be a tracking reference signal (TRS)/channel state indicator-reference signal (CSI-RS) or a synchronization signal block (SSB). In the narrow band-internet of things (NB-IOT), a base station may configure a gap as a transmission location of a wake-up signal (WUS).

Figure 2:
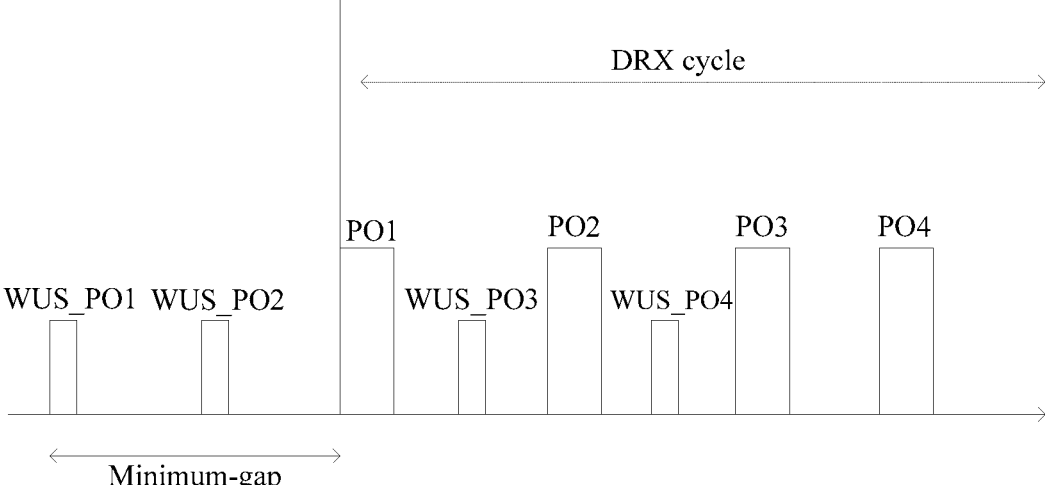
FIG. 2 is a schematic diagram showing under RRC-idle, a sequence-based WUS indication of a discontinuous reception (DRX) configuration provided by an embodiment of the present application.

Exemplarily, FIG. 2 is a schematic diagram showing under RRC-idle, a sequence-based WUS indication of a discontinuous reception (DRX) configuration provided by an embodiment of the present application. As shown in FIG. 2, each WUS associates with a paging occasion (PO), and each WUS indicates whether a PO needs to monitor paging.

Figure 3:
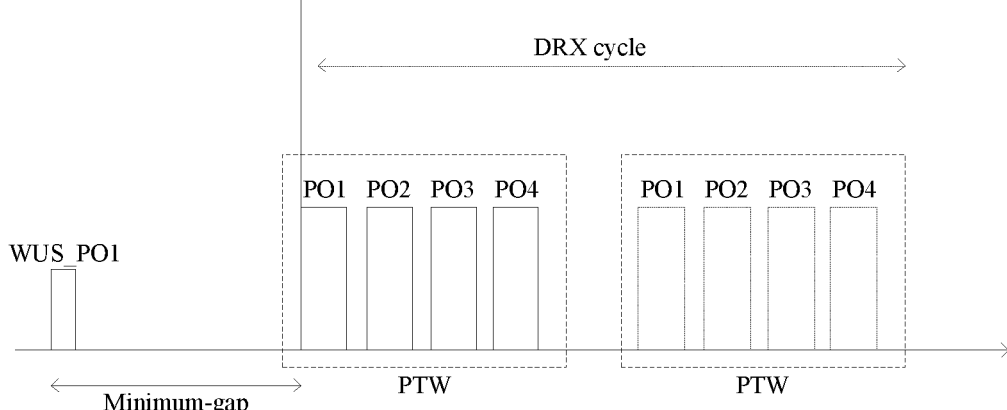
FIG. 3 is a schematic diagram showing under RRC-idle, a sequence-based WUS indication of an extended discontinuous reception (eDRX) configuration provided by an embodiment of the present application.

Exemplarily, FIG. 3 is a schematic diagram showing under RRC-idle, a sequence-based WUS indication of an extended discontinuous reception (eDRX) configuration provided by an embodiment of the present application. As shown in FIG. 3, each WUS may indicate a paging time window (PTW), and a PTW may provide multiple repeated POs, and a paging message may be transmitted repeatedly in the PTW, UE may selectively transmit and receive a paging message on the PO. Among them, a location of the WUS is bound to a location of a first WUS in the PTW.

Among the possible ways, a TRS/CSI-RS based on RRC-connected may be used for channel time-frequency tracking under RRC-Idle, where the TRS/CSI-RS assists an SSB to complete the channel tracking, to reduce the number of SSB burst sets and further save energy.

In one embodiment, a base station may configure a short gap (G1) and a long gap (G2) at the same time. For example, Table 1 shows an example of sequence-based parameter configuration in an eDRX configuration. When the configured gap (for example, G1 or G2 in case 1, G1 or G2 in case 2) is the same as "a minimum-gap between a WUS and a PO associated with the WUS", UE receives paging messages; otherwise, UE does not receive paging messages.

TABLE 1

| A minimum-gap between a WUS and a PO associated with the WUS | UE expects that the WUS includes G1 | UE expects that the WUS includes G2 |
|---|---|---|
| Case 1: {40 ms or 240 ms} | Receive | Not receive |
| Case 2: {1 s or 2 s} | Not receive | Receive |

On the one hand, neither the DCI-based PEI indication method nor sequence-based PEI indication method considers a location relationship between a PEI and an SSB. A TRS/CSI-RS under RRC-Idle may not always exist, and configuration may necessary to obtain the TRS/CSI-RS. For example, a configuration mode may include: an implicit signaling indication, an explicit signaling indication from a base station (gNB), and UE blind detection. Therefore, existence of a TRS/CSI-RS and a location relationship between the PEI and the TRS/CSI-RS should be considered when configuring the transmission and reception of the PEI. In UE energy saving, if a location of the PEI of the UE is far from the SSB, the UE needs to conduct more state transitions, which will consume more energy; further, if the location of the PEI is far from the SSB or the TRS, the UE may be unable to complete synchronization or channel tracking, which will reduce the demodulation and decoding performance of the PEI.

On the other hand, in NR, when the base station configures locations of POs, these locations may be configured as continuous (or called uniform) locations or non-continuous (or called non-uniform) locations. For the POs with a relatively short distance, considering the energy saving of the UE, if two WUSs configured by the base station indicate the POs separately, there may be a problem of WUS collision, or a problem of resource waste, or an unnecessary waste of power consumption.

Based on these, an embodiment of the present application provides a signal processing method, where a network device configures a location of a paging indication signal for a terminal device in an idle state, after the network device transmits the paging indication signal to the terminal device according to the location of the paging indication signal, the terminal device may avoid consuming more energy caused by a relatively long distance between the location of the paging indication signal and a synchronization reference signal, and/or, the terminal device may avoid reducing the demodulation and decoding performance of the paging indication signal caused by a relatively long distance between the location of the paging indication signal and a channel time-frequency tracking reference signal.

In the following, terms of the embodiments of the present application will be described.

The terminal device involved in the embodiments of the present application may be a device that provides voice and/or data connectivity to a user, a handheld device with wireless connection functions, or other processing device connected to a wireless modem. In different systems, the names of the terminal device may also be different. For example, in a 5G system, the terminal device may be called as a user equipment (UE). The wireless terminal device may communicate with one or more core networks (CN) through a radio access network (RAN). The wireless terminal device may be a mobile terminal device, such as, a mobile phone (or a "cellular" phone) and a computer with a mobile terminal device, such as a portable, pocket, handheld, built-in or vehicle-mounted mobile apparatus, which exchanges language and/or data with the wireless access network. For example, a personal communication service (PCS) telephone, a cordless telephone, a session initiation protocol (SIP) telephone, a wireless local loop (WLL) station, a personal digital assistant (PDA) and other devices. The wireless terminal device may also be referred to as a system, a subscriber unit, a subscriber station, a mobile station, a mobile, a remote station, an access point, a remote terminal, an access terminal, a user terminal, a user agent, a user device, which is not limited in the embodiments of the present application.

The network device involved in the embodiments of the present application may be a base station, which may include multiple cells providing services for a terminal. Depending on the specific application scenario, the base station may also be called as an access point, a device in the access network that communicates with a wireless terminal device through one or more sectors on the air interface, or other names. The network device may be configured to exchange a received air frame with an Internet protocol (IP) packet, worked as a router between the wireless terminal device and the rest of the access network, where the rest of the access network may include an Internet protocol (IP) communication network. The network device may further coordinate an attribute management of an air interface. For example, the network device involved in the embodiments of the present application may be a network device (BTS) in a global system for mobile communications (GSM) or a code division multiple access (CDMA) system, or a network device (NodeB) in a wideband code division multiple access (WCDMA), an evolutional node B (eNB or e-NodeB) in a long term evolution (LTE) system, a 5G base station (gNB) in a 5G network architecture (next generation system), or a home evolved node B (home evolved node B, HeNB), a relay node (relay node), a femtocell (femto), a picocell, etc., which is not limited in the embodiments of the present application. In some network structures, the network device may include a centralized unit (CU) node and a distributed unit (DU) nodes, and the centralized unit and the distributed unit may also be geographically separated.

The embodiments of the present application solve the above problem will be given with reference to specific embodiments. The following specific embodiments may be implemented independently or combined with each other. The same or similar concepts or processes may not be repeated in some embodiments.

Figure 4:
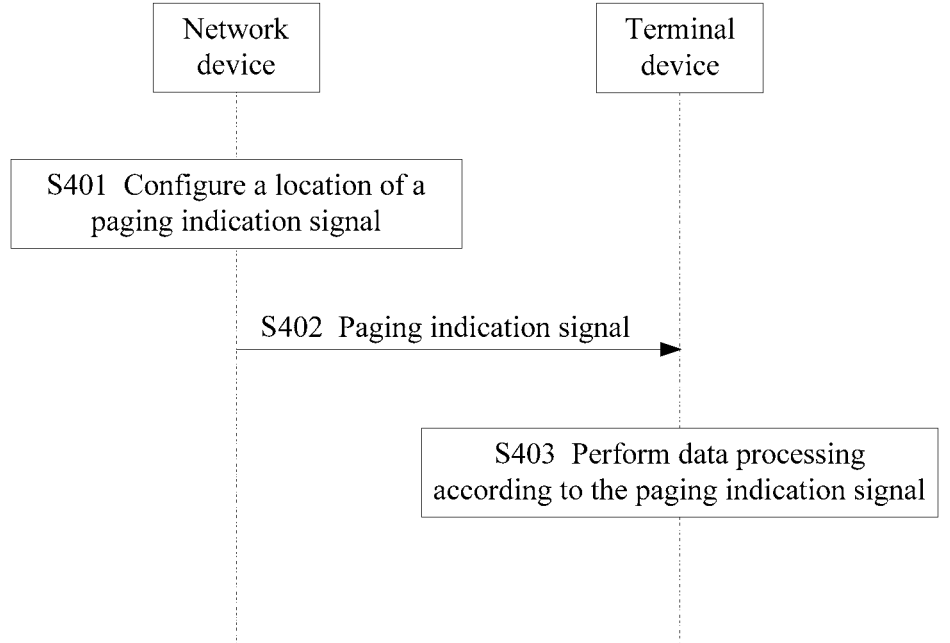
FIG. 4 is a schematic flowchart of a signal processing method provided by an embodiment of the present application.

FIG. 4 is a schematic flowchart of a signal processing method provided by an embodiment of the present application, including the following steps:

S401: a network device configures a location of a PEI.

In the embodiment of the present application, the PEI may be a DCI-based indication signal or a sequence-based indication signal, the PEI is configured to indicate at least one of the following, including: whether a paging signal exists at a paging location, or whether to monitor a PDCCH of a paging signal at a paging location, or whether to monitor a paging signal at a paging location, or whether to wake up to monitor a paging signal during a paging cycle. In the possible understanding, in this manner, whether there are various kinds of signals is indicated explicitly. Or it may be understood that, it is indicated that there are various kinds of signals when the various kinds of signals exist, and it is indicated that there are no signals when the various kinds of signals do not exist.

In one embodiment, the PEI is configured to indicate at least one of the following, including: existence of a paging signal at a paging location, monitoring a PDCCH of a paging signal at a paging location, or monitoring a paging signal at a paging location, or waking up to monitor a paging signal during a paging cycle. In the possible understanding, in this manner, the existence of various kinds of signals is indicated explicitly, and indication is performed implicitly when no signals exists. Or it may be understood that it is only indicated when the various kinds of signals exist, but it is not indicated when the various kinds of signals do not exist.

In the embodiment of the present application, the location of the PEI may be a location where the network device transmits the paging indication signal, or may be the location where the terminal device receives the paging indication signal.

In one embodiment, the network device may be a transmitting node, and the location of the PEI may be a transmission location where the transmitting node transmits the paging indication signal. In one embodiment, the terminal device may be a receiving node, and the location of the PEI may be a receiving location where the receiving node receives the paging indication signal. Or it may be understood that the location of the PEI described in the embodiments of the present application may be a receiving location or a transmission location of the PEI.

In the embodiment of the present application, the network device configures the location of the paging indication signal for the terminal device in the idle state, where the idle state is a state in which no normal data transmission is carried out between the network device and the terminal device. Among them, the location of the paging indication signal associates with any of following information: information about a location of a paging signal, information about a location of a channel time-frequency tracking reference signal or information about a location of a synchronization reference signal. In the embodiment of the present application, the channel time-frequency tracking reference signal may a tracking reference signal (TRS)/channel state indicator reference signal (CSI-RS), and the synchronization reference signal may be an SSB.

Figure 5:
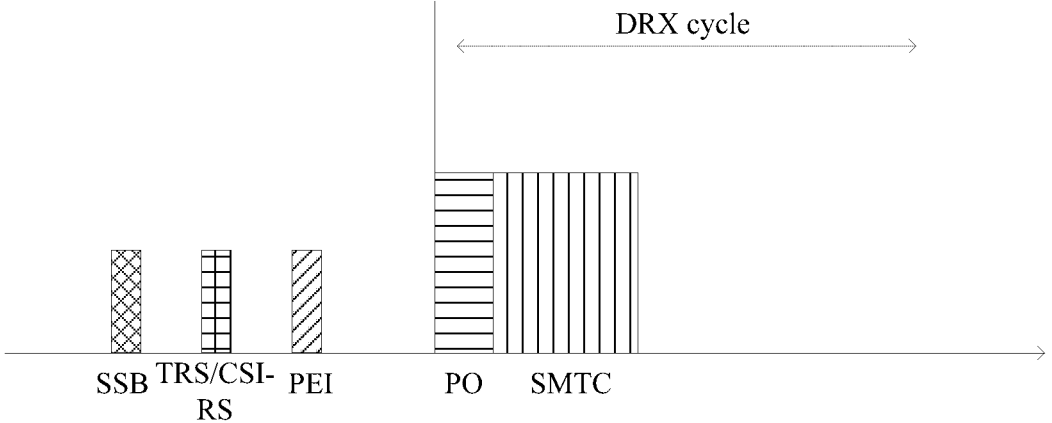
FIG. 5 is a schematic diagram of a location relationship between a PEI, a channel time-frequency tracking reference signal and a synchronization reference signal provided by an embodiment of the present application.

Exemplarily, FIG. 5 is a schematic diagram of a location relationship between a PEI, a TRS/CSI-RS and an SSB provided by an embodiment of the present application. As shown in FIG. 5, the base station transmits an SSB, a TRS/CSI-RS and a PEI in turn. In a DRX cycle, the base station may further transmit a paging signal and an SS/PBCH block measurement timing configuration (SMTC) signal.

S402: the network device transmits the PEI to the terminal device.

S403: the terminal device performs data processing according to the PEI.

In the embodiment of the present application, the specific transmitting manner of the PEI transmitted by network device to terminal device is not limited.

In the embodiment of the present application, the specific implementation of data processing performed by the terminal device according to the PEI is not limited.

In summary, after configuring the location of the PEI, the network device transmits the PEI to the terminal device, and according to the PEI, the terminal device may avoid consuming more energy caused by a relatively long distance between the location of the PEI and an SSB, and/or, avoid reducing the demodulation and decoding performance of the PEI caused by a relatively long distance between the location of the PEI and a TRS/CSI-RS.

Figure 6:
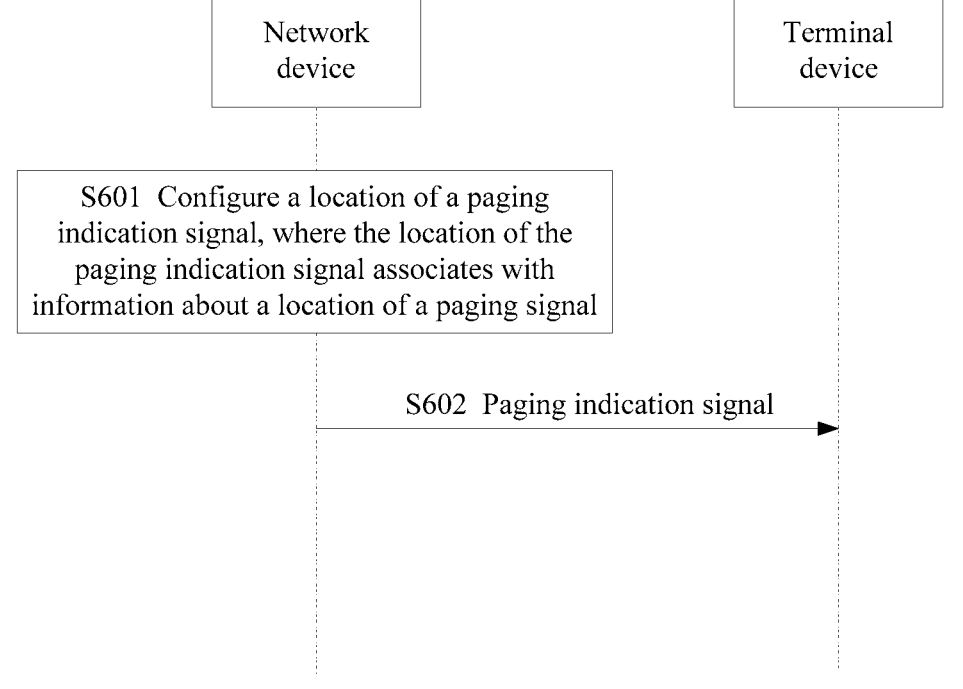
FIG. 6 is a schematic flowchart of a signal processing method provided by an embodiment of the present application.

It should be noted that FIG. 4 shows a schematic flowchart of interactions between the network device and the terminal device. From the perspective of the network device side, FIG. 6 shows a schematic flowchart of a signal processing method provided by an embodiment of the present application, including the following steps:

S601: a network device configures a location of a PEI, where the location of the PEI associates with information about a location of a paging signal.

In the embodiment of the present application, the paging signal is a signal transmitted at a paging location for paging a terminal device. The information about the location of the paging signal includes at least one of the following: a cycle of the paging signal, the number of paging frames (PF) in the paging cycle, the number of paging locations in the PF, a time-domain offset in the PF of the paging location, a time-domain offset of the paging location, the number of monitoring occasions (MO) of the paging PDCCH at the paging location, a starting location of the MO of the paging PDCCH at the paging location or a starting location of the MO of the paging PDCCH at a first (foremost) paging location in the PF.

Exemplarily, the cycle of the paging signal may be configured as 32 wireless frames, 64 wireless frames, 128 wireless frames or 256 wireless frames, and other values are not limited.

Exemplarily, the number of PFs in the paging cycle may be configured through signaling, indicating that several PFs are configured for one paging cycle, and the paging cycle includes at least one PF, where the unit of each PF is a wireless frame, for example, a PF is 10 ms.

Exemplarily, the number of paging locations in the PF may be configured through radio resource control (RRC), indicating a configuration of the number of paging locations in the PF, where the PF includes at least one paging location.

Exemplarily, the number of MOs of the PDCCH at the paging location may be configured through signaling, or may be the same as the number of SSBs. The paging location includes at least one MO of the PDCCH, and the MOs of the paging PDCCH of at least one paging location in the PF may be sequence numbers of continuous and effective MOs, or may be configured separately through signaling.

Figure 7:
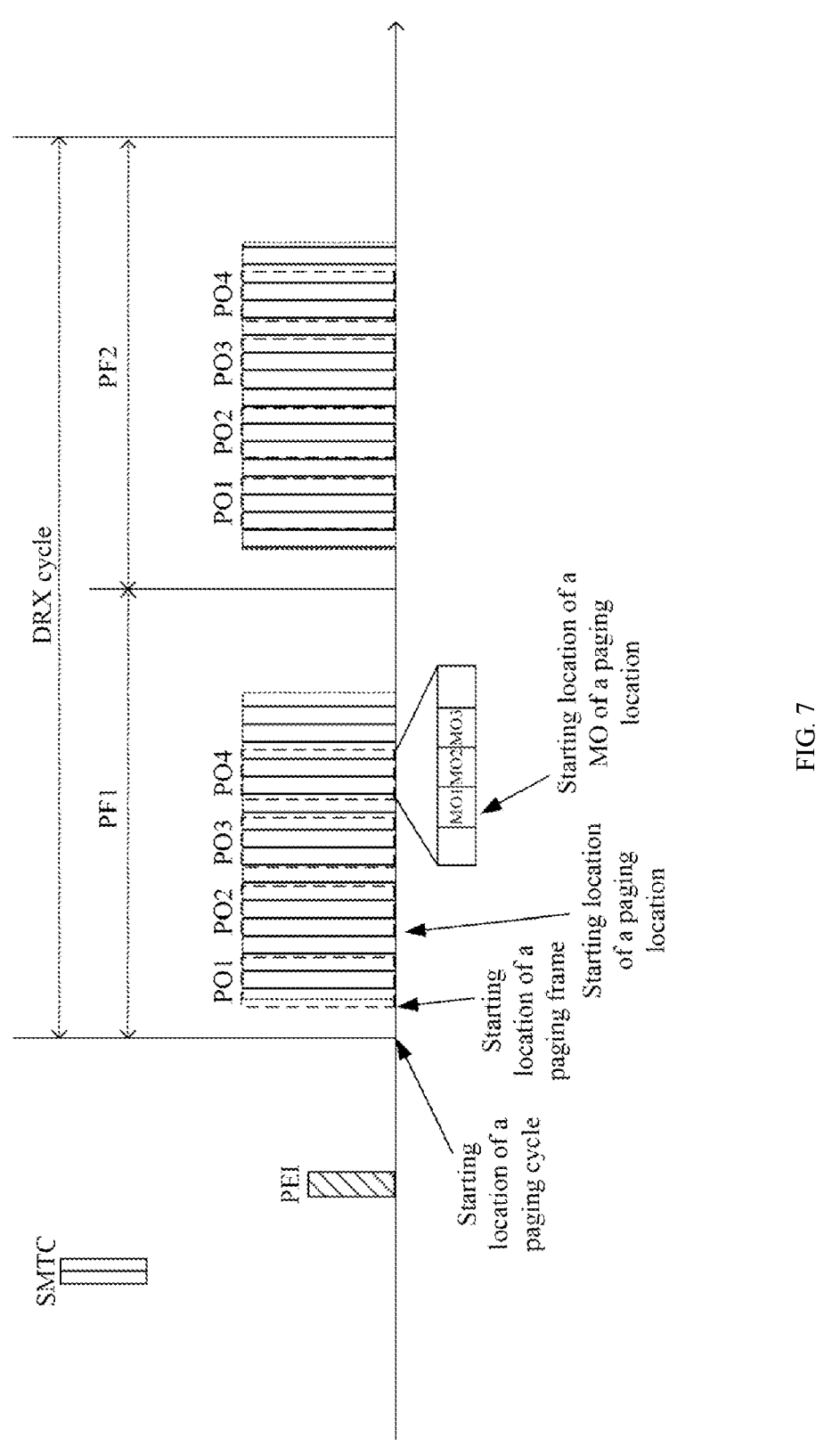
FIG. 7 is a schematic diagram of a location relationship within a paging cycle provided by an embodiment of the present application.

Exemplarily, FIG. 7 is a schematic diagram of various location relationships within a paging cycle provided by an embodiment of the present application. As shown in FIG. 7, FIG. 7 includes the starting location of the PF, the starting location of the paging cycle, the starting location of the paging location and the starting location of the MO of the paging location. Among them, the starting location of the paging location includes a starting location in the starting PF and a starting paging location in the second PF.

Figure 8:
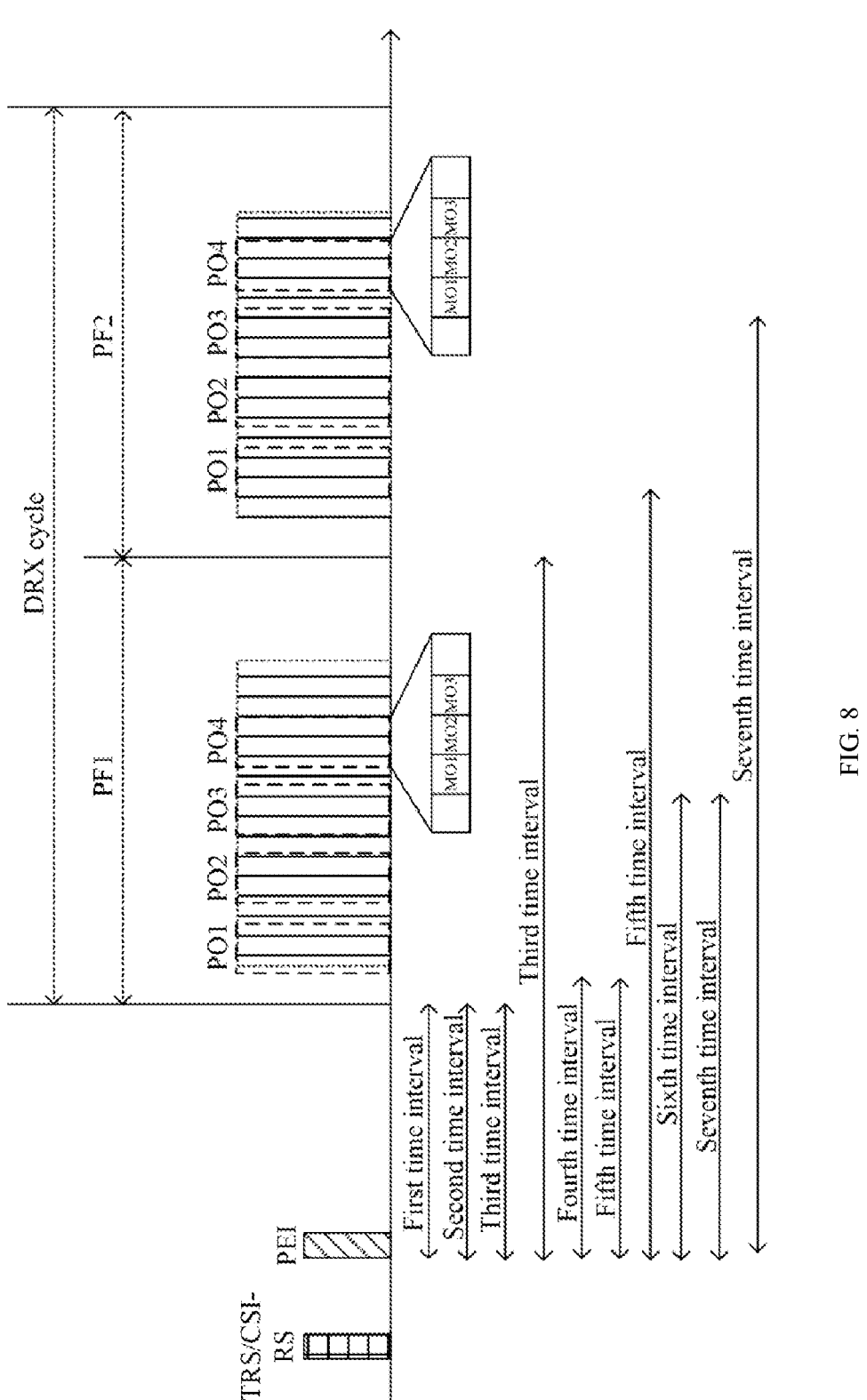
FIG. 8 is a schematic diagram of a first type of time intervals provided by an embodiment of the present application.

In the embodiment of the present application, the location of the paging indication signal and the information about the location of the paging signal are a first type of time intervals. Exemplarily, FIG. 8 is a schematic diagram of a first type of time intervals provided by an embodiment of the present application. As shown in FIG. 8, a time interval between the location of the PEI and the starting location of the paging cycle of the paging signal is a first time interval; or a time interval between the location of the PEI and the location of a starting PF of the paging signal is a second time interval; or a time interval between the location of PEI and the starting location of the PF of the paging signal is a third time interval; or the location of a time interval between the PEI and the starting paging location of the PF of paging signal is a fourth time interval; or a time interval between the location of the PEI and a paging location of the PF of paging signal is a fifth time interval; or a time interval between the location of the PEI and the monitoring occasion MO of a first paging physical layer downlink control channel PDCCH at a starting paging location of the PF of the paging signal is a sixth time interval; or a time interval between the location of the PEI and the monitoring occasion MO of the PDCCH of a first paging at the paging location of the PF of the paging signal is a seventh time interval.

Among them, the first time interval, the second time interval, the third time interval, the fourth time interval, the fifth time interval, the sixth time interval and the seventh time interval may be equal or unequal, and the specific lengths of the intervals may be set according to the actual application scenario, which is not specifically limited by the embodiments of the present application.

Figure 9:
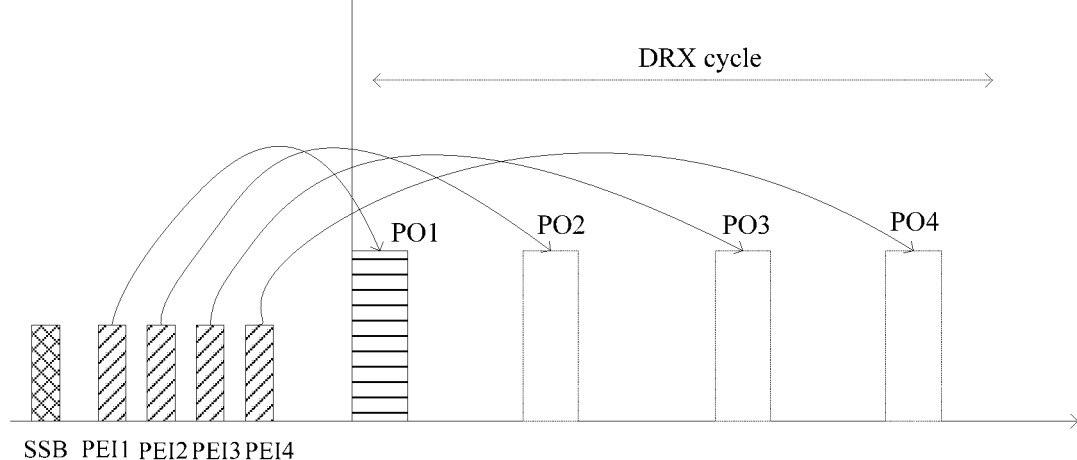
FIG. 9 is a schematic diagram of indication of a PEI provided by an embodiment of the present application.

Exemplarily, FIG. 9 is a schematic diagram of indication of a PEI provided by an embodiment of the present application. One PEI is configured to indicate one PO. As shown in FIG. 9, a PEI1 indicates a paging location PO1, a PEI2 indicates a paging location PO2, a PEI3 indicates a paging location PO3, and a PEI4 indicates a paging location PO4; where no matter when the paging location (for example, the PO1, the PO2, the PO3 and the PO4) starts, the paging indication signal indicates a corresponding paging location PO.

Figure 10:
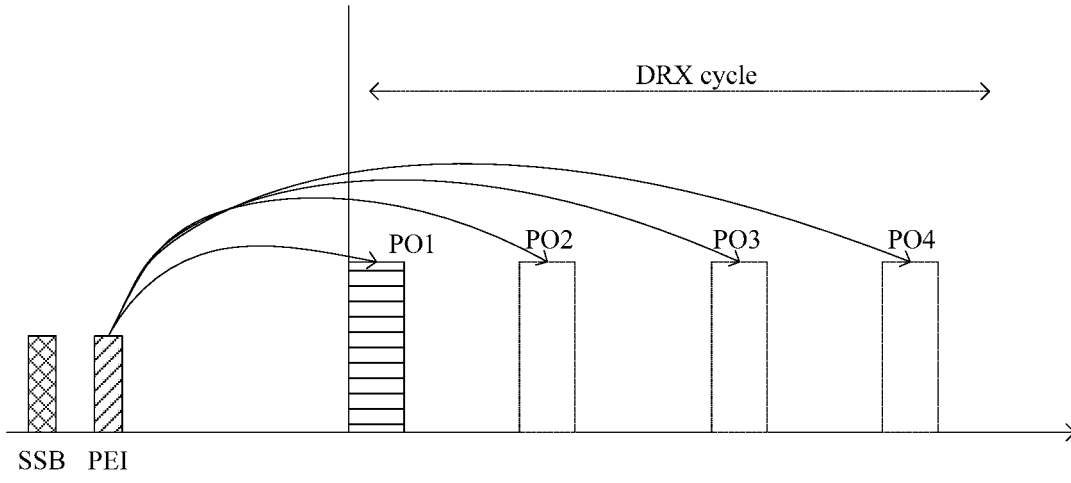
FIG. 10 is a schematic diagram of indication of a PEI provided by an embodiment of the present application.

Exemplarily, FIG. 10 is a schematic diagram of indication of a PEI provided by an embodiment of the present application. One PEI is configured to indicate multiple POs. As shown in FIG. 10, a PEI1 indicates a paging location PO1, a paging location PO2, a paging location PO3 or a paging location PO4, in other words, a paging indication signal indicates whether monitoring of a paging PDCCH needs to be performed on all paging locations in a PF.

In the embodiment of the present application, the PEI may also indicate the monitoring of a paging PDCCH of a PF in a paging cycle, for example, one PEI indicates the monitoring of paging PDCCHs at multiple different paging locations and/or with different paging contents. In one embodiment, multiple PEIs indicate the monitoring of paging PDCCHs at multiple different paging locations and/or with different paging contents, where locations of the multiple PEIs in time domain are no later than a starting location of the PF, and a single PEI indicates monitoring of the paging PDCCH at a single paging location, and each PEI has a different time interval with respect to the paging location.

Figure 11:
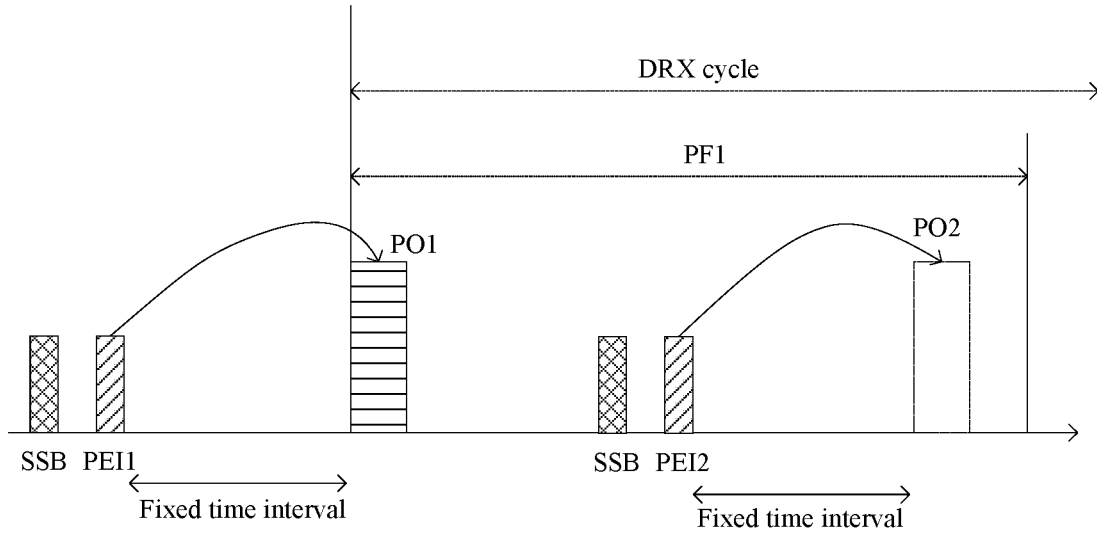
FIG. 11 is a schematic diagram of indication of a PEI provided by an embodiment of the present application.

Exemplarily, FIG. 11 is a schematic diagram of indication of a PEI provided by an embodiment of the present application. As shown in FIG. 11, a PEI1 indicates a paging location PO1, a PEI2 indicates a paging location PO2, where there is a fixed time interval between the PEI and the paging location PO.

S602: the network device transmits the PEI to the terminal device.

In summary, after configuring the location of the PEI, the network device transmits the PEI to the terminal device, and according to the PEI, the terminal device may avoid consuming more energy caused by a relatively long distance between the location of the PEI and an SSB, and/or, avoid reducing the demodulation and decoding performance of the PEI caused by a relatively long distance between the location of the PEI and a TRS/CSI-RS.

Figure 12:
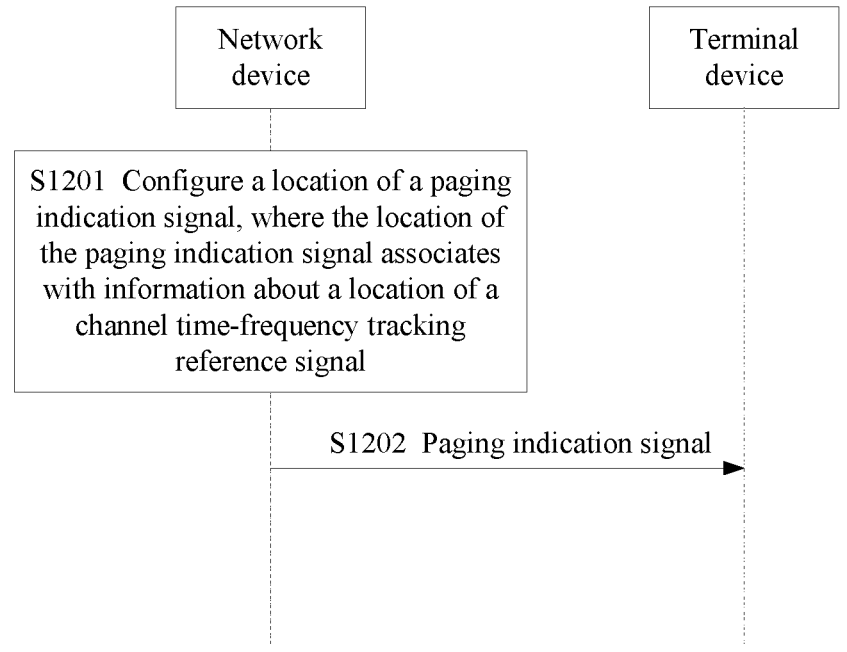
FIG. 12 is a schematic diagram of indication of a PEI provided by an embodiment of the present application.

On the basis of the embodiment shown in FIG. 4, FIG. 12 is a schematic flowchart of a signal processing method provided by an embodiment of the present application, including the following steps:

S1201: a network device configures a location of a paging indication signal, where the location of the paging indication signal associates with information about a location of a channel time-frequency tracking reference signal.

In the embodiment of the present application, the channel time-frequency tracking reference signal is configured to complete signal synchronization, time-domain channel deviation estimation or frequency-domain signal deviation estimation. The information about the location of the channel time-frequency tracking reference signal includes at least one of the following: an indication whether a channel time-frequency tracking reference signal is transmitted, a transmission cycle, a transmission duration in time domain, symbol(s) transmitted in each slot, a pattern configuration of resource elements (RE) transmitted in each resource block (RB), a time-domain offset or a frequency-domain bandwidth.

Figure 13:
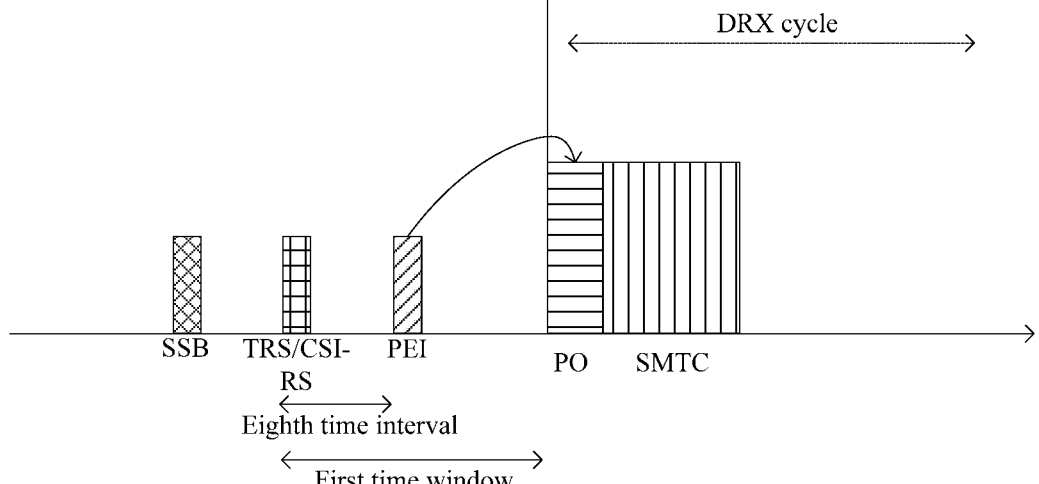
FIG. 13 is a schematic diagram of indication of a PEI provided by an embodiment of the present application.

Exemplarily, FIG. 13 is a schematic diagram of indication of a PEI provided by an embodiment of the present application. As shown in FIG. 13, the network device transmits an SSB, a TRS/CSI-RS and a PEI in turn, where a transmission of the PEI is no earlier than the TRS/CSI-RS; or a transmission location of the PEI is later than a transmission location of the TRS/CSI-RS in time domain; or a time interval between a transmission location of the PEI and a transmission location of the TRS/CSI-RS is an eighth time interval; or a transmission location of the PEI is within a first time window starting from a transmission location of the TRS/CSI-RS.

Figure 14:
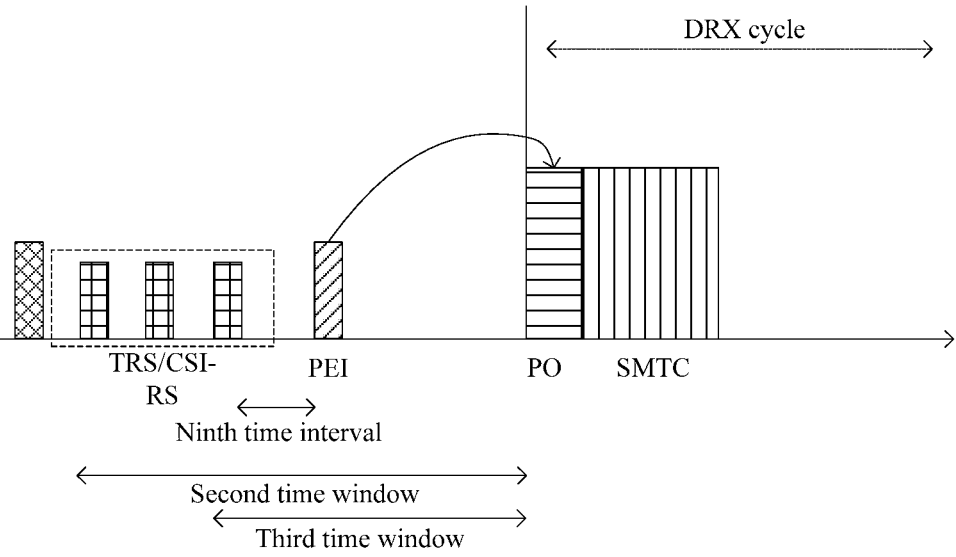
FIG. 14 is a schematic diagram of indication of a PEI provided by an embodiment of the present application.

Exemplarily, FIG. 14 is a schematic diagram of indication of a PEI provided by an embodiment of the present application. As shown in FIG. 14, the network device transmits an SSB, a TRS/CSI-RS and a PEI in turn, where a transmission location of the PEI is no earlier than a reference signal with a latest transmission location among multiple TRS/CSI-RSs; or a transmission location of the PEI is later than transmission locations of the channel time-frequency tracking reference signals in time domain; or a time interval between a transmission location of the PEI and a reference signal with a latest transmission location among the multiple TRS/CSI-RSs is a ninth time interval; or a transmission location of the PEI is within a second time window starting from a transmission location of a starting reference signal among the multiple TRS/CSI-RSs; or the transmission location of the PEI is within a third time window starting from a transmission location of a last reference signal among the multiple TRS/CSI-RSs.

S1202: the network device transmits the paging indication signal to the terminal device.

In summary, after configuring the location of the PEI, the network device transmits the PEI to the terminal device, and according to the PEI, the terminal device may avoid consuming more energy caused by a relatively long distance between the location of the PEI and an SSB, and/or, avoid reducing the demodulation and decoding performance of the PEI caused by a relatively long distance between the location of the PEI and a TRS/CSI-RS.

Figure 15:
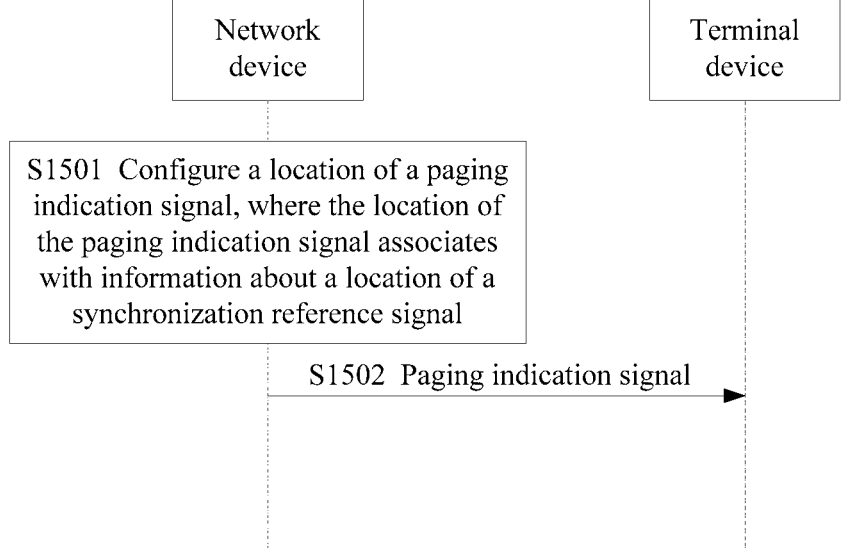
FIG. 15 is a schematic flowchart of a signal processing method provided by an embodiment of the present application.

On the basis of the embodiment shown in FIG. 4, FIG. 15 is a schematic flowchart of a signal processing method provided by an embodiment of the present application, including the following steps:

S1501: a network device configures a location of a paging indication signal, where the location of the paging indication signal associates with information about a location of a synchronization reference signal.

In the embodiment of the present application, the synchronization reference signal is configured to complete a coarse synchronization or fine synchronization of a channel, which may include wireless frame synchronization, slot synchronization, subframe synchronization, symbol synchronization or subcarrier synchronization. The synchronization reference signal may also complete other types of synchronization, which is not limited in the embodiments of the present application.

In the embodiment of the present application, the information about the location of the synchronization reference signal includes at least one of the following: a transmission period, a transmission duration in time domain, symbol(s) transmitted in each slot, a time-domain offset, a frequency-domain offset or a frequency-domain bandwidth; other information about the location of the synchronization reference signal may be set according to the actual application scenario, which is not limited in the embodiment of the present application.

Figure 16:
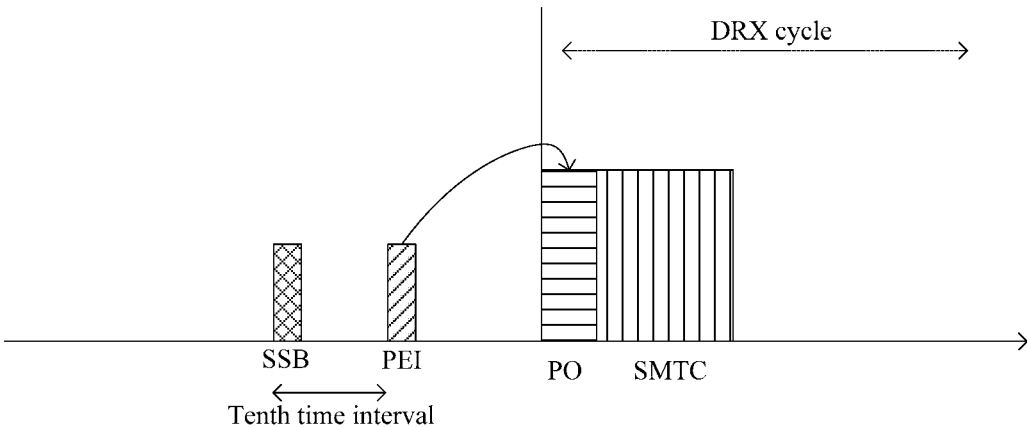
FIG. 16 is a schematic diagram of indication of a PEI provided by an embodiment of the present application.

Exemplarily, FIG. 16 is a schematic diagram of indication of a PEI provided by an embodiment of the present application. As shown in FIG. 16, a transmission of the PEI is no earlier than the synchronization reference signal; or a transmission location of the PEI is later than a transmission location of the SSB in time domain; or a time interval between a transmission location of the PEI and the transmission location of the SSB is a tenth time interval.

Figure 17:
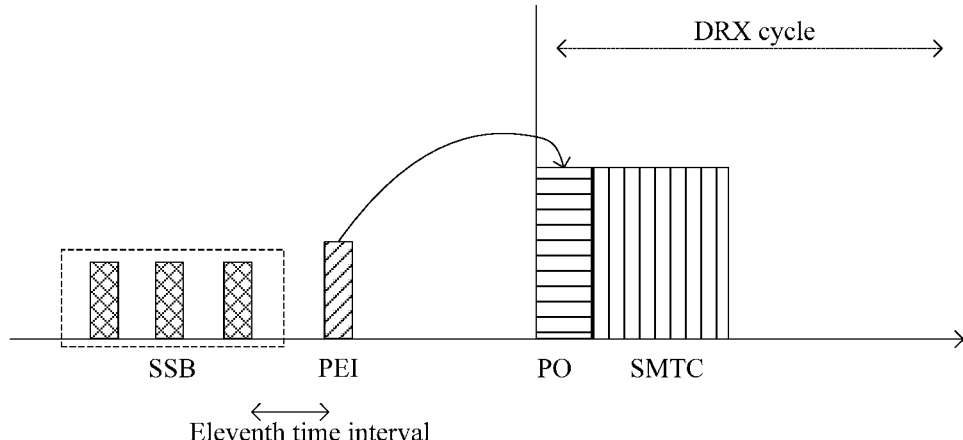
FIG. 17 is a schematic diagram of indication of a PEI provided by an embodiment of the present application.
Figure 18:
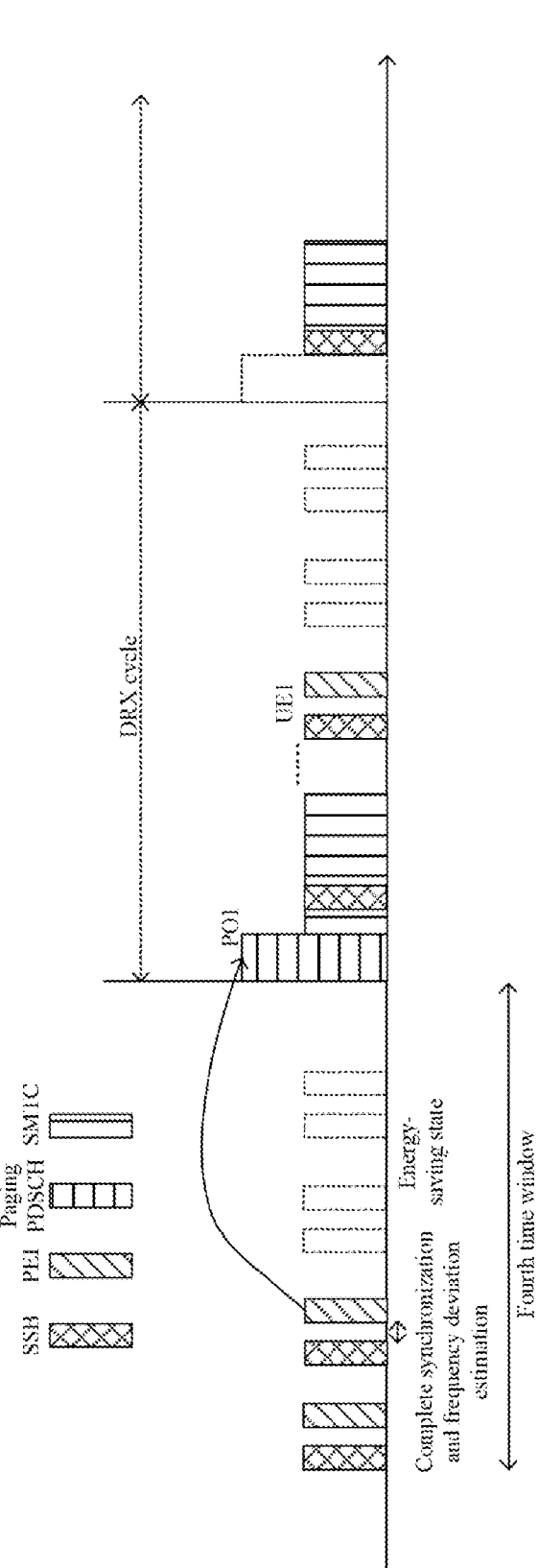
FIG. 18 is a schematic diagram showing that a transmission of a PEI is no earlier than a first SSB among multiple SSBs provided by an embodiment of the present application.

Exemplarily, FIG. 17 is a schematic diagram of indication of a PEI provided by an embodiment of the present application. As shown in FIG. 17, a transmission of the paging indication signal is no earlier than a reference signal with a latest transmission location among multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval. Exemplarily, FIG. 18 is a schematic diagram showing that a transmission of a PEI is no earlier than a first SSB among multiple SSBs provided by an embodiment of the present application. As shown in FIG. 18, a transmission of a PEI is no earlier than a first SSB among multiple SSBs, where the PEI indicates PO1 for a UE1 to determine whether to receive a paging message. In the time interval between the PEI and the SSB, the base station may complete synchronization and frequency deviation estimation, and the non-working PEI is in an energy-saving state (for example, deep sleep (deep sleep)).

Figure 19:
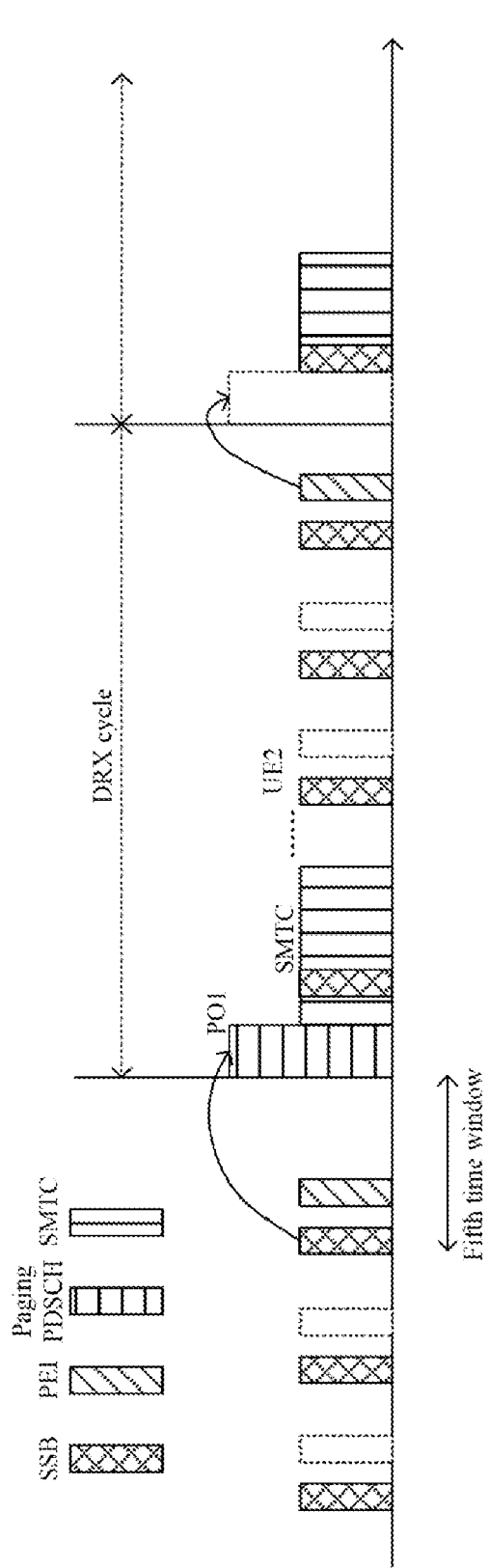
FIG. 19 is a schematic diagram showing that a transmission of a PEI is no earlier than a last SSB among multiple SSBs provided by an embodiment of the present application.

Exemplarily, FIG. 19 is a schematic diagram showing that a transmission of a PEI is no earlier than a last SSB among multiple SSBs provided by an embodiment of the present application. As shown in FIG. 19, a PEI indicates a PO1 for a UE2 to determine whether to receive a paging message. The transmission of the PEI is no earlier than a last SSB among multiple SSBs.

In the embodiment of the present application, the PEI may be repeatedly transmitted after multiple SSBs; or the PEI may be transmitted after multiple SSBs to indicate different terminal subgroups at the same paging location.

Figure 20:
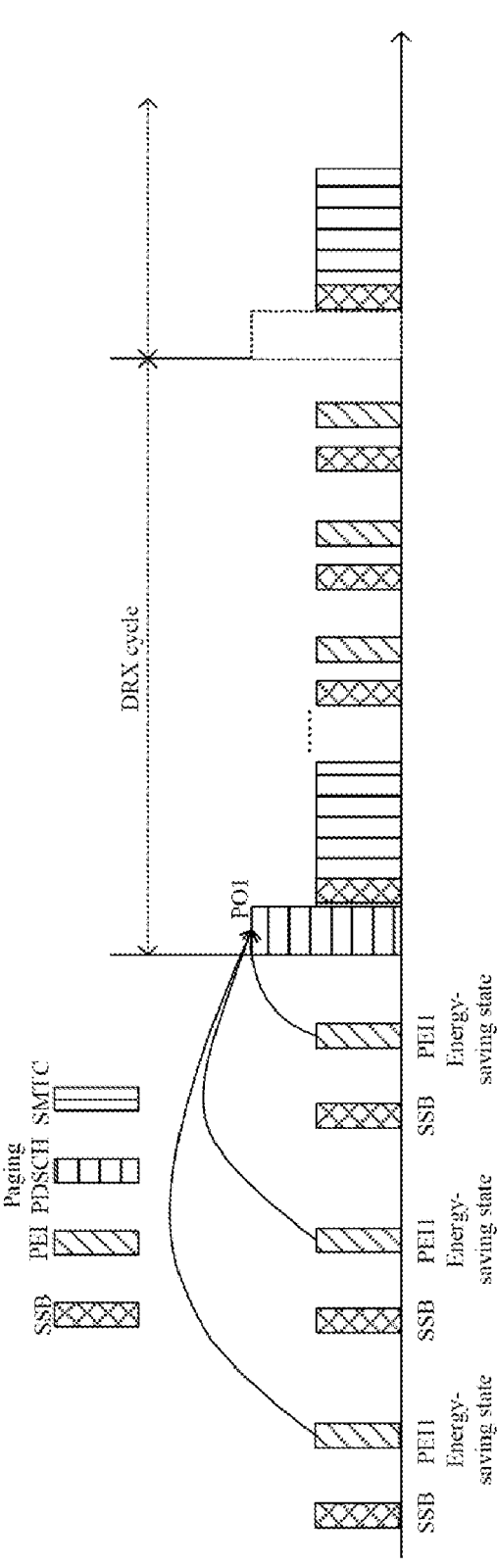
FIG. 20 is a schematic diagram of repeatedly transmission of a PEI indication after SSBs provided by an embodiment of the present application.

Exemplarily, FIG. 20 is a schematic diagram of repeatedly transmission of a PEI indication after SSBs provided by an embodiment of the present application. As shown in FIG. in the process of receiving paging messages by the terminal device, the terminal device may receive different numbers of SSBs in order to ensure synchronization performance since the terminal device may be located at different locations of the base station. Among them, the same PEI is in an energy-saving state (for example, light sleep (light sleep)).

Figure 21:
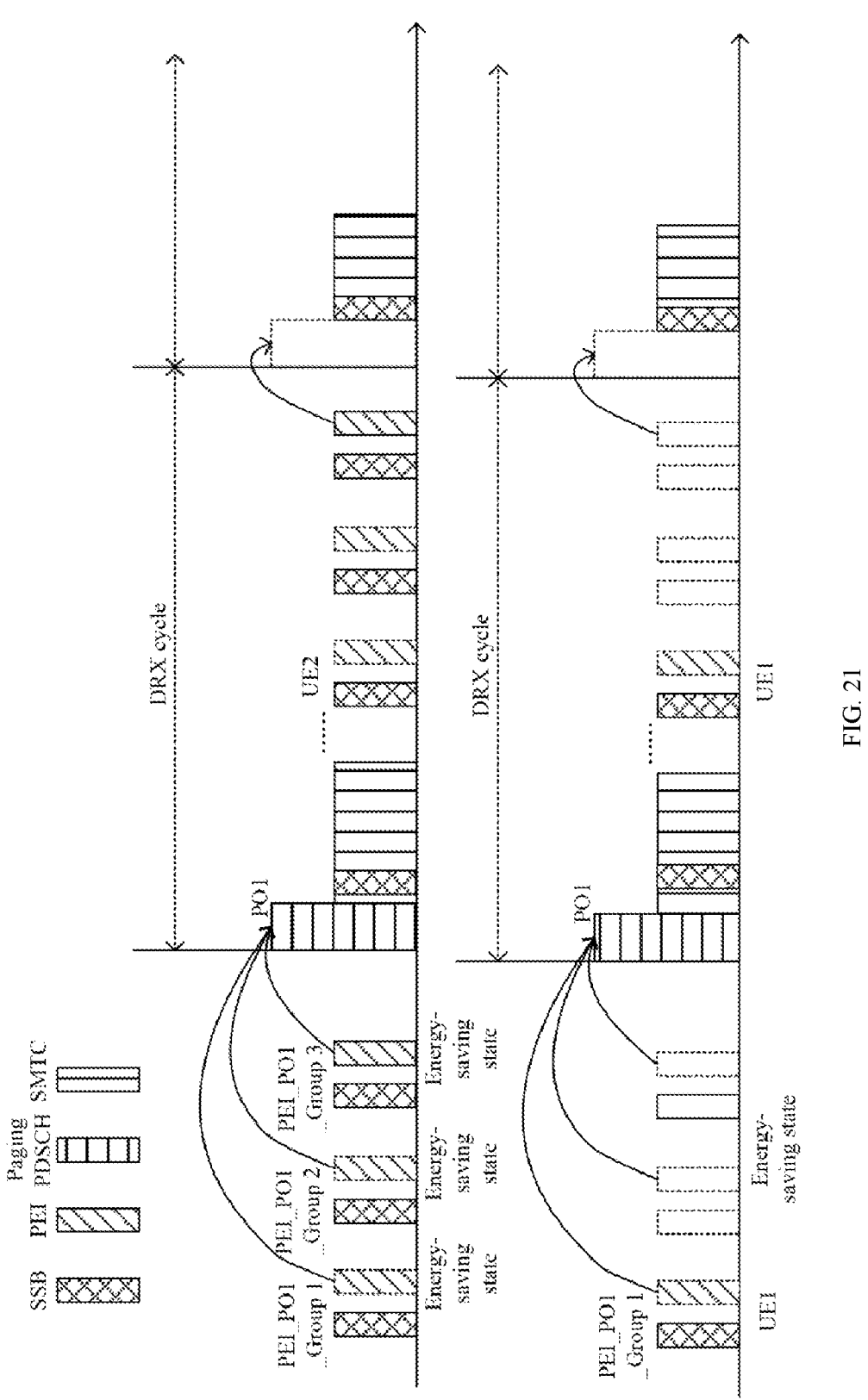
FIG. 21 is a schematic diagram of a PEI indicating different terminal subgroups of the same PO provided by an embodiment of the present application.

Exemplarily, FIG. 21 is a schematic diagram of a PEI indicating different terminal subgroups of the same PO provided by an embodiment of the present application. As shown in FIG. 21, the PEI may be transmitted after multiple synchronization reference signals to indicate different terminal subgroups at the same paging location. For example, terminal subgroups include a PEI_PO1_group 1, a PEI_PO1_group 2 and a PEI_PO1_group 3, the PEI is in an energy saving state (for example, light sleep (light sleep)). For example, a terminal device UE1 includes the PEI_PO1_group 1, configured to indicate whether to listen for a paging message during the paging cycle. Among them, the PEI is in an energy-saving state (for example, deep sleep (deep sleep)).

S1502: the network device transmits the paging indication signal to the terminal device.

In summary, after configuring the location of the PEI, the network device transmits the PEI to the terminal device, and according to the PEI, the terminal device may avoid consuming more energy caused by a relatively long distance between the location of the PEI and an SSB, and/or, avoid reducing the demodulation and decoding performance of the PEI caused by a relatively long distance between the location of the PEI and a TRS/CSI-RS.

Figure 22:
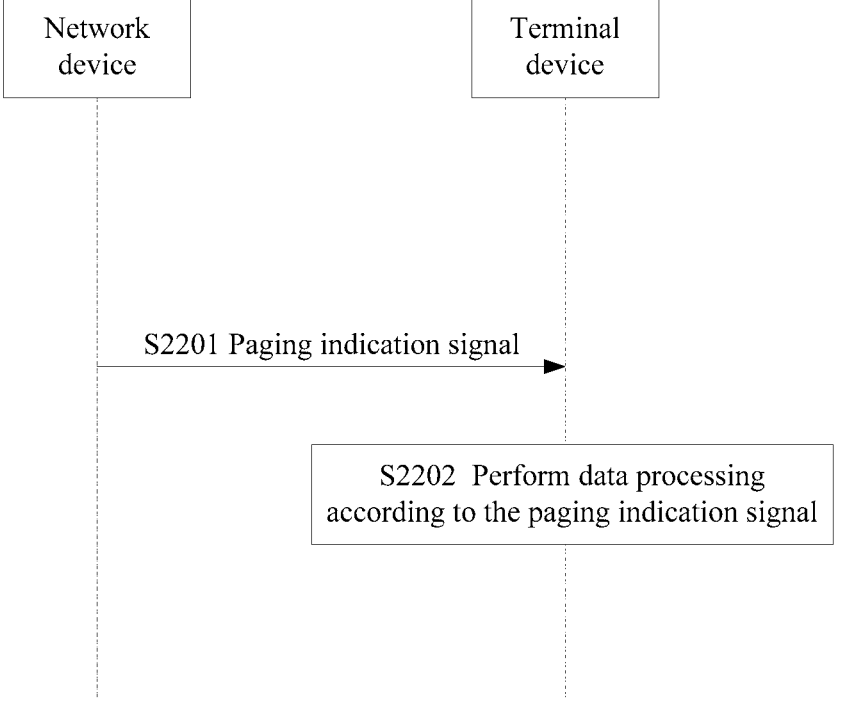
FIG. 22 is a schematic flowchart of a signal processing method provided by an embodiment of the present application.

Exemplarily, FIG. 22 is a schematic flowchart of a signal processing method provided by an embodiment of the present application, as shown in FIG. 22, the method may include the following steps:

S2201: a terminal device receives a paging indication signal from a network device.

In the embodiment of the present application, the terminal device is in an idle state, which is a state in which no normal data transmission is carried out between the network device and the terminal device. In the idle state, the terminal only performs basic wireless link wireless resource management measurement, synchronization, channel time-frequency tracking, paging message reception, a random access procedure or beam management procedure.

In the embodiment of the present application, the paging indication signal is based on configuration of the network device. For the configuration of the location of the paging indication signal by the network device, reference may be made to the content of the corresponding embodiments in FIG. 6-FIG. 21.

S2202: the terminal device performs data processing according to the paging indication signal.

Exemplarily, after receiving the paging indication signal, the terminal device may perform data processing according to the paging indication signal. For example, after receiving the paging indication signal, if the paging indication signal indicates that a paging message needs to be received, the terminal device receives a paging PDCCH, In one embodiment, as well as a paging PDSCH, and performs corresponding demodulation and decoding; if the paging indication signal indicates that it is not necessary to receive a paging message, the terminal device will not receive a paging PDCCH and a paging PDSCH.

In summary, after configuring the location of the PEI, the network device transmits the PEI to the terminal device, and according to the PEI, the terminal device may avoid consuming more energy caused by a relatively long distance between the location of the PEI and an SSB, and/or, avoid reducing the demodulation and decoding performance of the PEI caused by a relatively long distance between the location of the PEI and a TRS/CSI-RS.

It can be seen from the above implementation schemes that the network device may configure a better transmission location of the paging indication signal in combination with the transmission location of the paging signal, the channel time-frequency tracking reference signal and the synchronization reference signal, thus reducing the conversion power consumption of the terminal device, avoiding the reduction of the demodulation and decoding performance of the paging indication signal, avoiding the possible collision of paging indication signals or the occurrence of additional power consumption caused by resource waste, as well as reducing the power consumption caused by invalid paging PDCCH monitoring of the terminal.

Figure 23:
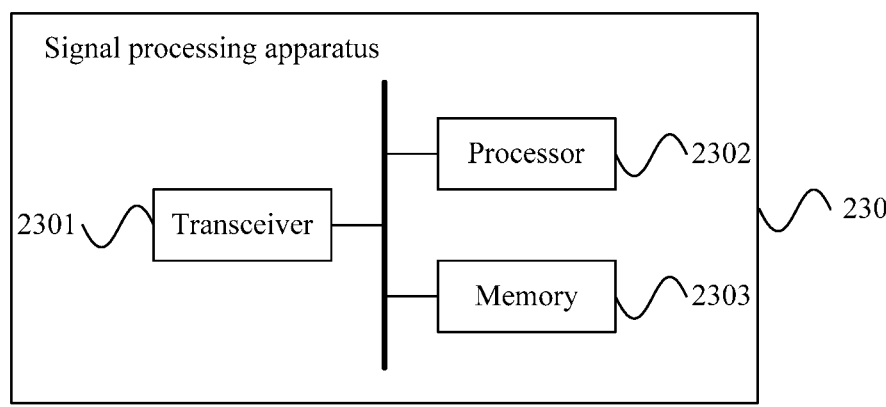
FIG. 23 is a schematic diagram of a signal processing apparatus provided by an embodiment of the present application.

On the network device side, an embodiment of the present application provides a signal processing apparatus. As shown in FIG. 23, the signal processing apparatus 230 of the embodiment of the present application may be a network device. The signal processing apparatus 230 includes: a transceiver 2301, a processor 2302 and a memory 2303.

The transceiver 2301 is configured to receive and transmit data under control of the processor 2302.

Among them, in FIG. 23, a bus architecture may include any number of interconnected buses and bridges. In one embodiment, one or more processors represented by the processor 2302 and various circuits of memory represented by the memory 2303 are linked together. The bus architecture may also link various other circuits together, such as, a peripheral device, a voltage regulator and a power management circuit, which are well known in the art and will not be further described in the embodiment of the present application. The bus interface provides interfaces. The transceiver 2301 may be elements, including a transmitter and a receiver, providing a device for communicating with various other devices via a transmission medium, including a wireless channel, a wired channel, an optical cable and other transmission mediums. The processor 2302 is responsible for managing the bus architecture and general processing, and the memory 2303 may store data used by the processor 2302 when performing an operation.

The processor 2302 may be a central processing unit (CPU), an application specific integrated circuit (ASIC), a field-programmable gate array (FPGA) or a complex programmable logic device (CPLD), and the processor may also adopt a multi-core architecture.

The processor 2302 is configured to execute any of the methods related to the network device provided by the embodiments of the present application according to the obtained executable instructions by calling the computer program stored in the memory 2303. The processor and the memory may also be physically separated.

In one embodiment, the processor 2302 is configured to perform the following operations: configuring a location of a paging indication signal for a terminal device in an idle state; and causing the transceiver 2301 to transmit the paging indication signal to the terminal device according to the location of the paging indication signal.

In one embodiment, the processor further performs the following operations: the location of the paging indication signal associates with any of following information: information about a location of a paging signal, information about a location of a channel time-frequency tracking reference signal or information about a location of a synchronization reference signal.

In one embodiment, the processor further performs the following operations: the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the processor 2302 further performs the following operations: the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, the processor 2302 further performs the following operations: if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the processor 2302 further performs the following operations: the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, the processor 2302 further performs the following operations: if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the transceiver 2301 further performs the following operations: transmitting a synchronization reference signal and/or a channel time-frequency tracking reference signal to the terminal device.

In one embodiment, the processor further performs the following operations: the paging indication signal is repeatedly transmitted after multiple synchronization reference signals; or the paging indication signal is transmitted after multiple synchronization reference signals to indicate different terminal subgroups at a same paging location.

It should be noted here that the above apparatus provided in the present application can realize all the method steps realized by the network device in the above method embodiments, and can achieve the same effect. The same parts and beneficial effects in this embodiment and the method embodiments will not be described herein in detail.

Figure 24:
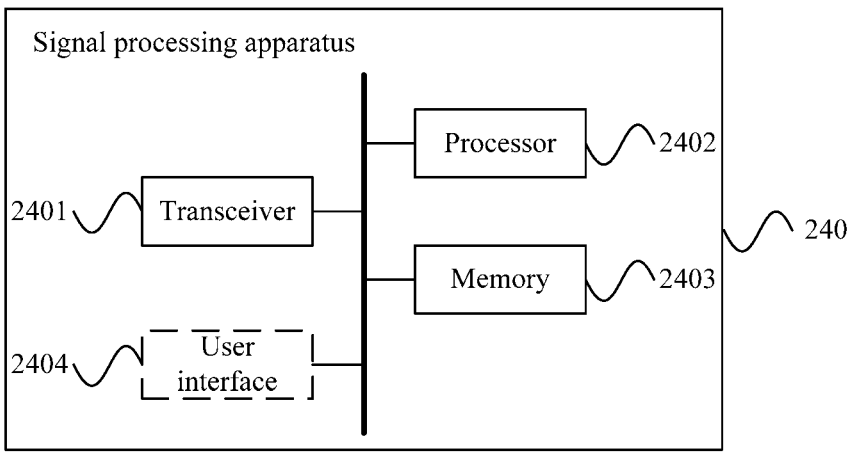
FIG. 24 is a schematic diagram of a signal processing method apparatus provided by an embodiment of the present application.

On the terminal device side, an embodiment of the present application provides a signal processing apparatus. As shown in FIG. 24. The signal processing apparatus 240 of this embodiment may be a terminal device, and the signal processing apparatus 240 may include a transceiver 2401, a processor 2402, and a memory 2403.

The transceiver 2401 is configured to receive and transmit data under control of the processor 2402.

In FIG. 24, a bus architecture may include any number of interconnected buses and bridges. In one embodiment, one or more processors represented by the processor 2402 and various circuits of memory represented by the memory 2403 are linked together. The bus architecture may also link various other circuits together, such as, a peripheral device, a voltage regulator and a power management circuit, which are well known in the art and will not be further described herein. The bus interface provides interfaces. The transceiver 2301 may be elements, including a transmitter and a receiver, providing a device for communicating with various other devices via a transmission medium, including a wireless channel, a wired channel, an optical cable and other transmission mediums. In one embodiment, the signal processing apparatus 240 may further include a user interface 2404. For different user equipment, the user interface 2404 may also be an interface that can connect required devices externally and internally. The connected device includes, but is not limited to, a keypad, a display, a speaker, a microphone, a joystick, etc.

The processor 2402 is responsible for managing the bus architecture and general processing, and the memory 2403 may store data used by the processor 2402 when performing an operation.

In one embodiment, the processor 2402 may be a CPU, an ASIC, a FPGA or a CPLD, and the processor may also adopt a multi-core architecture.

The processor 2402 is configured to execute any of the methods related to the terminal device provided by the embodiments of the present application according to the obtained executable instructions by calling the computer program stored in the memory 2403. The processor and memory may also be physically separated.

In one embodiment, the processor 2402 is configured to perform the following operations: causing the transceiver 2401 to receive a paging indication signal from a network device, where the terminal device is in an idle state, and the paging indication signal is transmitted by the network device based on configuration of a location of the paging indication signal; and performing data processing according to the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the processor 2402 further performs the following operations: the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the processor 2402 further performs the following operations: the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, the processor 2402 further performs the following operations: if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the transceiver 2401 further performs the following operations: receiving a synchronization reference signal and/or a channel time-frequency tracking reference signal from the network device.

In one embodiment, the processor 2402 further performs the following operations: the paging indication signal is repeatedly transmitted after multiple synchronization reference signals; or the paging indication signal is transmitted after multiple synchronization reference signals to indicate different terminal subgroups at a same paging location.

It should be noted here that the above apparatus provided in the present application can realize all the method steps realized by the terminal device in the above method embodiments, and can achieve the same effect. The same parts and beneficial effects in this embodiment and the method embodiments will not be described herein in detail.

Figure 25:
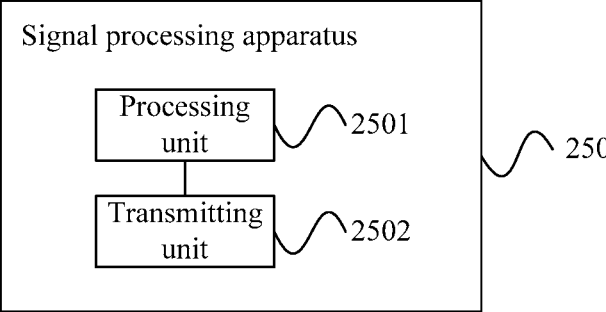
FIG. 25 is a schematic diagram of a signal processing method apparatus provided by an embodiment of the present application.

On the network device side, an embodiment of the present application also provides a signal processing apparatus. As shown in FIG. 25, the signal processing apparatus 250 of this embodiment may be a network device, and the signal processing apparatus 250 includes: a processing device 2501 and a transmitting device 2502.

The processing device 2501 is configured to configure a location of a paging indication signal for a terminal device in an idle state; and the transmitting device 2502 is configured to transmit the paging indication signal to the terminal device according to the location of the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the processing device 2501 is specifically configured for: the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the processing device 2501 is specifically configured for: the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, the processing device 2501 is specifically configured for: if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the processing device is specifically configure for: the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, the processing device 2501 is specifically configured for: if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the transmitting device 2502 is specifically configured to transmit a synchronization reference signal and/or a channel time-frequency tracking reference signal to the terminal device.

In one embodiment, the processing device 2501 is specifically configured for: the paging indication signal is repeatedly transmitted after multiple synchronization reference signals; or the paging indication signal is transmitted after multiple synchronization reference signals to indicate different terminal subgroups at a same paging location.

It should be noted here that the above apparatus provided in the present application can realize all the method steps realized by the network device in the above method embodiments, and can achieve the same effect. The same parts and beneficial effects in this embodiment and the method embodiments will not be described herein in detail.

Figure 26:
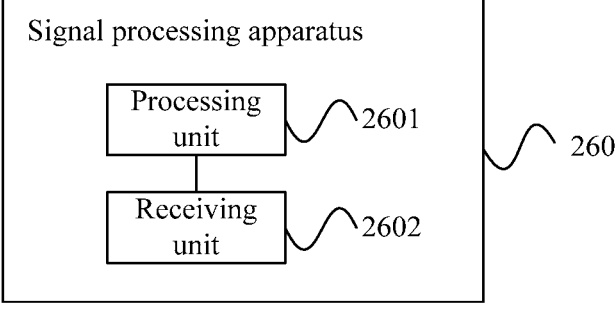
FIG. 26 is a schematic diagram of a signal processing method apparatus provided by an embodiment of the present application.

On the terminal device side, an embodiment of the present application also provides a signal processing apparatus. As shown in FIG. 26, the signal processing device 260 of the embodiment of the present application may be a terminal device, and the signal processing device 260 includes: a receiving device 2602 and a processing device 2601.

The receiving device 2602 is configured to receive a paging indication signal from a network device, wherein the terminal device is in an idle state, and the paging indication signal is transmitted by the network device based on configuration of a location of the paging indication signal; and the processing device 2601 is configured to perform data processing according to the paging indication signal.

In one embodiment, the location of the paging indication signal associates with any of following information: information about a location of a paging signal, information about a location of a channel time-frequency tracking reference signal or information about a location of a synchronization reference signal.

In one embodiment, the location of the paging indication signal and the information about the location of the paging signal meet any one of following: a time interval between the location of the paging indication signal and a starting location of a paging cycle of the paging signal is a first time interval; or a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion MO of a first paging physical layer downlink control channel PDCCH at a starting paging location of a paging frame of the paging signal is a sixth time interval; or a time interval between the location of the paging indication signal and a monitoring occasion MO of a first paging PDCCH at a paging location of a paging frame of the paging signal is a seventh time interval.

In one embodiment, the location of the paging indication signal and the information about the location of the channel time-frequency tracking reference signal meet any one of following: a transmission of the paging indication signal is no earlier than the channel time-frequency tracking reference signal; or a transmission location of the paging indication signal is later than a transmission location of the channel time-frequency tracking reference signal in time domain; or a time interval between a transmission location of the paging indication signal and a transmission location of the channel time-frequency tracking reference signal is an eighth time interval; or a transmission location of the paging indication signal is within a first time window starting from a transmission location of the channel time-frequency tracking reference signal.

In one embodiment, if there are multiple channel time-frequency tracking reference signals; the location of the paging indication signal and information about locations of the channel time-frequency tracking reference signals meet any one of following: a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

In one embodiment, the location of the paging indication signal and the information about the location of the synchronization reference signal meet any one of following: a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

In one embodiment, if there are multiple synchronization reference signals, the location of the paging indication signal and the information about the location of the synchronization reference signal meet any one of following: a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a time interval between a transmission location of the paging indication signal and a reference signal with a latest transmission location among the multiple synchronization reference signals is an eleventh time interval; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

In one embodiment, the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, where locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

In one embodiment, the receiving device 2602 is specifically configured to receive a synchronization reference signal and/or a channel time-frequency tracking reference signal from the network device.

In one embodiment, the paging indication signal is repeatedly transmitted after multiple synchronization reference signals; or the paging indication signal is transmitted after multiple synchronization reference signals to indicate different terminal subgroups at a same paging location.

It should be noted here that the above apparatus provided in the embodiments of the present application can realize all the method steps realized by the terminal device in the above method embodiments, and can achieve the same effect. The same parts and beneficial effects in this embodiment and the method embodiments will not be described herein in detail.

It should be noted that the division of units in the embodiment of the present application is illustrative, and is only a logical function division, there may be other division manners in actual implementations. In addition, each functional unit in each embodiment of the present application may be integrated in one processing unit, or may exist physically alone, or two or more units be integrated in one unit. The above integrated unit may be implemented in a form of hardware or software functional unit.

If the integrated unit is implemented in the form of software functional unit and sold or used as an independent product, it may be stored in a processor-readable storage medium. Based on this understanding, the embodiments of the present application or the part that contributes to the existing technology or all or part of the embodiments may be embodied in the form of a software product, which is stored in a storage medium and includes several instructions to enable a computer device (which may be a personal computer, a server, or a network device, etc.) or a processor to perform all or a part of the steps of the method described in the embodiments of the present application. The aforementioned storage medium includes: a USB flash disk, a removable hard disk, a ROM, a random access memory (RAM), a magnetic disk or an optical disk and other medium that can store a program code.

On the network device side, an embodiment of the present application provides a processor-readable storage medium. The processor-readable storage medium stores a computer program, which is used to enable a processor to perform any of the methods related to the network device provided by the embodiments of the present application. It enables the processor to realize all the method steps realized by the network device in the above method embodiments, and can achieve the same effect. The same parts and beneficial effects in this embodiment and the method embodiments will not be described herein in detail.

On the terminal device side, an embodiment of the present application provides a processor-readable storage medium. The processor-readable storage medium stores a computer program, which is used to enable a processor to perform any of the methods related to the network device provided by the embodiments of the present application. It enables the processor to realize all the method steps realized by the terminal device in the above method embodiments, and can achieve the same effect. The same parts and beneficial effects in this embodiment and the method embodiments will not be described herein in detail.

The processor-readable storage medium may be any available medium or data storage device that the processor can access, including but not limited to a magnetic memory (such as, a floppy disk, a hard disk, a magnetic tape, a magneto-optical disk (MO), etc.), an optical memory (such as, a compact disc (CD), a digital video disc (DVD), a Blu-ray disc (BD), a high-definition versatile disc (HVD), etc.), and a semiconductor memory (such as, an read-only memory (ROM), an erasable programmable read-only memory (EPROM), an electrically erasable programmable read-only memory (EEPROM), a non-volatile memory (NAND FLASH), a solid-state hard disk (SSD), etc.).

The embodiments of the present application can be provided as a method, a system, or a computer program product. Therefore, the present application may take the form of a complete hardware embodiment, a complete software embodiment, or an embodiment combining software and hardware aspects. In one embodiment, the present application may take the form of a computer program product implemented on one or more computer storage mediums (including but not limited to a disk memory and an optical memory, etc.) including computer-readable program codes.

The present application is described with reference to flow charts and/or block diagrams of the method, apparatus, and computer program product according to the embodiment of the present application. It should be understood that each flow and/or block in the flow charts and/or block diagrams and the combination of flow and/or block in the flow charts and/or block diagrams can be realized by computer-executable instructions. These computer-executable instructions can be provided to a processor of a general purpose computer, a special purpose computer, an embedded processor or other programmable data processing devices to generate a machine, and the instructions executed by the processor of a computer or other programmable data processing devices generate an apparatus for realizing the functions specified in one or more processes and/or one or more blocks of a flowchart.

These processor-executable instructions may also be stored in the processor-readable memory that can guide the computer or other programmable data processing devices to work in a specific way, and the instructions stored in the processor-readable memory generate a manufacturing product including an instruction apparatus, which implements the functions specified in one or more flows and/or one or more blocks of the flowchart.

These processor-executable instructions may also be loaded on a computer or other programmable data processing devices to enable a series of operation steps to be performed on the computer or other programmable devices to generate computer-implemented processing, and the instructions executed on the computer or other programmable devices provide steps for realizing the functions specified in one or more processes and/or one or more blocks of a flowchart.

The invention claimed is:

1. A signal processing method, comprising:

configuring, by a network device, a location of a paging indication signal for a terminal device in an idle state; and transmitting, by the network device, the paging indication signal to the terminal device according to the location of the paging indication signal;

wherein the location of the paging indication signal associates with any one of following information: information about a location of a paging signal, information about a location of a channel time-frequency tracking reference signal or information about a location of a synchronization reference signal;

wherein the location of the paging indication signal and the information about the location of the paging signal meet a time interval between the location of the paging indication signal and a starting location of a paging cycle of the paging signal is a first time interval;

wherein if there is one channel time-frequency tracking reference signal, the location of the paging indication signal and the information about the location of the channel time-frequency tracking reference signal meet a time interval between a transmission location of the paging indication signal and a transmission location of the channel time-frequency tracking reference signal is an eighth time interval;

wherein if there are multiple synchronization reference signals, the location of the paging indication signal and the information about the location of the synchronization reference signal meet a time interval between a transmission location of the paging indication signal and a reference signal with a latest transmission location among the multiple synchronization reference signals is an eleventh time interval.

2. The method according to claim 1, wherein the location of the paging indication signal and the information about the location of the paging signal further meet any one of following:

a time interval between the location of the paging indication signal and a location of a starting paging frame of the paging signal is a second time interval; or a time interval between the location of the paging indication signal and a starting location of a paging frame of the paging signal is a third time interval; or a time interval between the location of the paging indication signal and a starting paging location of a paging frame of the paging signal is a fourth time interval; or a time interval between the location of the paging indication signal and a paging location of a paging frame of the paging signal is a fifth time interval; or a time interval between the location of the paging indication signal and a monitoring occasion (MO) of a first paging physical layer downlink control channel (PDCCH) at a starting paging location of a paging frame of the paging signal is a sixth time interval; or a time interval between the location of the paging indication signal and a MO of a first paging PDCCH at a paging location of a paging frame of the paging signal is a seventh time interval.

3. The method according to claim 1, wherein the location of the paging indication signal and the information about the location of the channel time-frequency tracking reference signal further meet any one of following:

a transmission of the paging indication signal is no earlier than the channel time-frequency tracking reference signal; or a transmission location of the paging indication signal is later than a transmission location of the channel time-frequency tracking reference signal in time domain; or a transmission location of the paging indication signal is within a first time window starting from a transmission location of the channel time-frequency tracking reference signal.

4. The method according to claim 1, wherein if there are multiple channel time-frequency tracking reference signals; the location of the paging indication signal and information about locations of the channel time-frequency tracking reference signals meet any one of following:

a transmission location of the paging indication signal is no earlier than a reference signal with a latest transmission location among the multiple channel time-frequency tracking reference signals; or a transmission location of the paging indication signal is later than transmission locations of the channel time-frequency tracking reference signals in time domain; or a time interval between a transmission location of the paging indication signal and a reference signal with a latest transmission location among the multiple channel time-frequency tracking reference signals is a ninth time interval; or a transmission location of the paging indication signal is within a second time window starting from a transmission location of a starting reference signal among the multiple channel time-frequency tracking reference signals; or a transmission location of the paging indication signal is within a third time window starting from a transmission location of a last reference signal among the multiple channel time-frequency tracking reference signals.

5. The method according to claim 1, wherein if there is one synchronization reference signal, the location of the paging indication signal and the information about the location of the synchronization reference signal meet any one of following:

a transmission of the paging indication signal is no earlier than the synchronization reference signal; or a transmission location of the paging indication signal is later than a transmission location of the synchronization reference signal in time domain; or a time interval between a transmission location of the paging indication signal and a transmission location of the synchronization reference signal is a tenth time interval.

6. The method according to claim 1, wherein if there are multiple synchronization reference signals, the location of the paging indication signal and the information about the location of the synchronization reference signal further meet any one of following:

a transmission of the paging indication signal is no earlier than a reference signal with a latest transmission location among the multiple synchronization reference signals; or a transmission of the paging indication signal is no earlier than a reference signal with an earliest transmission location among the multiple synchronization reference signals; or a transmission location of the paging indication signal is within a fourth time window starting from a transmission location of a starting reference signal among the multiple synchronization reference signals; or a transmission location of the paging indication signal is within a fifth time window starting from a transmission location of a last reference signal among the multiple synchronization reference signals.

7. The method according to claim 1, wherein the paging indication signal is configured to indicate monitoring of a paging PDCCH of a paging frame in a paging cycle; or multiple paging indication signals are configured to indicate monitoring of paging PDCCHs at multiple different paging locations and/or with different paging contents, wherein locations of the multiple paging indication signals in time domain are no later than a starting location of the paging frame, and each of the paging indication signals indicates monitoring of a paging PDCCH at a single paging location, and each of the paging indication signals has a different time interval with respect to the paging location.

8. The method according to claim 1, wherein the method further comprises:

transmitting, by the network device, a synchronization reference signal and/or a channel time-frequency tracking reference signal to the terminal device.

9. The method according to claim 8, wherein the paging indication signal is repeatedly transmitted after multiple synchronization reference signals; or the paging indication signal is transmitted after multiple synchronization reference signals to indicate different terminal subgroups at a same paging location.

10. A signal processing apparatus, applied to a network device, comprising a memory, a transceiver and a processor:

the memory is configured to store a computer program; the transceiver is configured to transmit and receive data under control of the processor; and the processor is configured to read the computer program in the memory and perform the method according to claim 1.

11. A non-transitory processor-readable storage medium storing a computer program, wherein the computer program is configured to enable a processor to perform the method according to claim 1.

12. The method according to claim 2, wherein the method further comprises:

transmitting, by the network device, a synchronization reference signal and/or a channel time-frequency tracking reference signal to the terminal device.

13. The method according to claim 3, wherein the method further comprises:

transmitting, by the network device, a synchronization reference signal and/or a channel time-frequency tracking reference signal to the terminal device.

14. The method according to claim 12, wherein the paging indication signal is repeatedly transmitted after multiple synchronization reference signals; or the paging indication signal is transmitted after multiple synchronization reference signals to indicate different terminal subgroups at a same paging location.

15. A signal processing method, comprising:

receiving, by a terminal device, a paging indication signal from a network device, wherein the terminal device is in an idle state, and the paging indication signal is transmitted by the network device based on configuration of a location of the paging indication signal; and performing, by the terminal device, data processing according to the paging indication signal;

wherein the location of the paging indication signal associates with any one of following information: information about a location of a paging signal, information about a location of a channel time-frequency tracking reference signal or information about a location of a synchronization reference signal;

wherein the location of the paging indication signal and the information about the location of the paging signal meet a time interval between the location of the paging indication signal and a starting location of a paging cycle of the paging signal is a first time interval;

wherein if there is one channel time-frequency tracking reference signal, the location of the paging indication signal and the information about the location of the channel time-frequency tracking reference signal meet a time interval between a transmission location of the paging indication signal and a transmission location of the channel time-frequency tracking reference signal is an eighth time interval;

wherein if there are multiple synchronization reference signals, the location of the paging indication signal and the information about the location of the synchronization reference signal meet a time interval between a transmission location of the paging indication signal and a reference signal with a latest transmission location among the multiple synchronization reference signals is an eleventh time interval.

16. The method according to claim 15, wherein the method further comprises:

receiving, by the terminal device, a synchronization reference signal and/or a channel time-frequency tracking reference signal from the network device.

17. A non-transitory processor-readable storage medium storing a computer program, wherein the computer program is configured to enable a processor to perform the method according to claim 15.

18. A signal processing apparatus, applied to a terminal device, comprising a memory, a transceiver and a processor:

the memory is configured to store a computer program; the transceiver is configured to transmit and receive data under control of the processor; and the processor is configured to read the computer program in the memory and perform following operations:

receiving a paging indication signal from a network device; wherein the terminal device is in an idle state, and the paging indication signal is transmitted by the network device based on configuration of a location of the paging indication signal; and performing data processing according to the paging indication signal;

wherein the location of the paging indication signal associates with any one of following information: information about a location of a paging signal, information about a location of a channel time-frequency tracking reference signal or information about a location of a synchronization reference signal;

wherein the location of the paging indication signal and the information about the location of the paging signal meet a time interval between the location of the paging indication signal and a starting location of a paging cycle of the paging signal is a first time interval;

wherein if there is one channel time-frequency tracking reference signal, the location of the paging indication signal and the information about the location of the channel time-frequency tracking reference signal meet a time interval between a transmission location of the paging indication signal and a transmission location of the channel time-frequency tracking reference signal is an eighth time interval;

wherein if there are multiple synchronization reference signals, the location of the paging indication signal and the information about the location of the synchronization reference signal meet a time interval between a transmission location of the paging indication signal and a reference signal with a latest transmission location among the multiple synchronization reference signals is an eleventh time interval.

* * * * *